(12) United States Patent
Zieroth et al.

(10) Patent No.: US 12,482,369 B2
(45) Date of Patent: Nov. 25, 2025

(54) MULTI-LINGUAL TOGGLE SYSTEM WITH TRANSFERABLE SKILLS, COURSE MAPPING AND TRANSLANGUAGING CAPABILITIES ACROSS GLOBAL AND REGIONAL EDUCATIONAL JURISDICTIONS

(71) Applicant: Renaissance Learning, Inc., Wisconsin Rapids, WI (US)

(72) Inventors: Robert Zieroth, Wisconsin Rapids, WI (US); Ajay Mathew, Vancouver, WA (US); Julianne Robar, Lac des Loups (CA); Doris Chavez-Linville, Tampa, FL (US); Catherine N. Close, Maidson, WI (US); Mariel Z. Pina, Chandler, AZ (US)

(73) Assignee: Renaissance Learning, Inc., Wisconsin Rapids, WI (US)

( * ) Notice: Subject to any disclaimer, the term of this patent is extended or adjusted under 35 U.S.C. 154(b) by 0 days.

(21) Appl. No.: 18/395,318

(22) Filed: Dec. 22, 2023

(65) Prior Publication Data
US 2024/0274023 A1    Aug. 15, 2024

Related U.S. Application Data

(60) Provisional application No. 63/484,125, filed on Feb. 9, 2023.

(51) Int. Cl.
*G09B 5/02*    (2006.01)
*G06F 3/0484*    (2022.01)
*G06F 9/451*    (2018.01)

(52) U.S. Cl.
CPC ............. *G09B 5/02* (2013.01); *G06F 3/0484* (2013.01); *G06F 9/454* (2018.02)

(58) Field of Classification Search
CPC ............. G06F 3/0484; G06F 9/54; G09B 5/02
See application file for complete search history.

(56) References Cited

U.S. PATENT DOCUMENTS

| 3,245,157 A | 4/1966 | Laviana |
| 4,764,120 A | 8/1988 | Griffin et al. |

(Continued)

FOREIGN PATENT DOCUMENTS

| EP | 0697773 A2 | 2/1996 |
| EP | 0843432 A2 | 5/1998 |

(Continued)

OTHER PUBLICATIONS

Akahane-Yamada, R., et al. "Does Training in Speech Perception Modify Speech Production" Proceeding of Fourth International Conference on Spoken Language Processing. ICSLP 96, vol. 2, 1996, pp. 606-609 vol. 2.

(Continued)

*Primary Examiner* — Kesha Frisby
(74) *Attorney, Agent, or Firm* — PATENT LAW WORKS LLP

(57) ABSTRACT

A multi-lingual toggle ("MLT") system with transferable skills, course mapping and tranlanguaging capabilities across educational content from different regional and global jurisdictions is disclosed. The MLT system tracks student holistic and longitudinal growth towards developing a multiliterate brain and supports literacy education in multiple languages. The MLT system includes learning progression routines developed authentically to reflect literacy acquisition in the target language. The learning progressions are empirically validated through the application of an item response theory ("IRT") psychometric model to compute the difficulty of the skills associated with the learning progressions. There is a strong relationship between the ordering of the skills and the associated difficulties that presents an (Continued)

opportunity to create multilingual literacy trajectories that highlight how multilingual students achieve multiliteracy holistically, rather than in a monolingual sense. A key component is the identification and reporting of transferable skills between languages (e.g., English and Spanish) and a variant model allows learning objectives and associated data to be tracked across languages.

20 Claims, 14 Drawing Sheets

(56) References Cited

U.S. PATENT DOCUMENTS

| | | |
|---|---|---|
| 5,002,491 A | 3/1991 | Abrahamson et al. |
| 5,273,437 A | 12/1993 | Caldwell et al. |
| 5,379,221 A | 1/1995 | Schulter et al. |
| 5,540,589 A | 7/1996 | Waters |
| D377,339 S | 1/1997 | Beruscha et al. |
| RE35,449 E | 2/1997 | Derks |
| 5,697,789 A | 12/1997 | Sameth et al. |
| 5,724,357 A | 3/1998 | Derks |
| 5,735,693 A | 4/1998 | Groiss |
| 5,823,788 A | 10/1998 | Lemelson et al. |
| 5,870,709 A | 2/1999 | Bernstein |
| 5,885,083 A | 3/1999 | Ferrell |
| D408,381 S | 4/1999 | Nelson et al. |
| 6,021,119 A | 2/2000 | Derks et al. |
| 6,077,085 A | 6/2000 | Parry et al. |
| 6,120,297 A | 9/2000 | Morse, III et al. |
| D431,562 S | 10/2000 | Bhatia et al. |
| 6,178,308 B1 | 1/2001 | Bobrow et al. |
| D437,314 S | 2/2001 | DeLeon |
| 6,224,383 B1 | 5/2001 | Shannon |
| D447,729 S | 9/2001 | Song et al. |
| D447,740 S | 9/2001 | Johansson |
| D448,026 S | 9/2001 | Nicklos et al. |
| D448,375 S | 9/2001 | Walters et al. |
| 6,305,942 B1 | 10/2001 | Block et al. |
| 6,328,569 B1 | 12/2001 | Jenkins et al. |
| D452,863 S | 1/2002 | Madsen et al. |
| 6,343,935 B1 | 2/2002 | Clements |
| D469,763 S | 2/2003 | Searby et al. |
| D480,716 S | 10/2003 | Saikawa et al. |
| D481,037 S | 10/2003 | Searby |
| 6,665,000 B1 | 12/2003 | Buehler et al. |
| 6,732,148 B1 | 5/2004 | Estrada et al. |
| 6,807,395 B2 | 10/2004 | Iwazaki et al. |
| D501,643 S | 2/2005 | Strand et al. |
| 6,895,213 B1 | 5/2005 | Ward |
| 6,907,546 B1 | 6/2005 | Haswell et al. |
| 7,052,278 B2 | 5/2006 | Johnson et al. |
| D523,854 S | 6/2006 | Rinna et al. |
| 7,360,158 B1 | 4/2008 | Beeman |
| RE40,459 E | 8/2008 | Hawkins et al. |
| 7,415,537 B1 | 8/2008 | Maes |
| 7,502,855 B2 | 3/2009 | Swanson et al. |
| 7,698,367 B2 | 4/2010 | Mason et al. |
| 7,761,591 B2 | 7/2010 | Graham |
| 7,788,647 B2 | 8/2010 | Martin et al. |
| 8,060,489 B1 | 11/2011 | Raman et al. |
| 8,696,365 B1 | 4/2014 | Bainbridge et al. |
| 9,251,130 B1 | 2/2016 | Lynnes et al. |
| 10,015,213 B2 | 7/2018 | Goldman et al. |
| 10,825,348 B2 | 11/2020 | Angel et al. |
| 11,250,721 B2 | 2/2022 | Angel et al. |
| 11,527,172 B2 | 12/2022 | Goldman et al. |
| 11,862,041 B2 | 1/2024 | Angel et al. |
| 12,094,018 B1 | 9/2024 | O'Malley |
| 2001/0003040 A1 | 6/2001 | Spector |
| 2001/0018703 A1 | 8/2001 | Miyazawa et al. |
| 2002/0107726 A1 | 8/2002 | Torrance et al. |
| 2002/0192631 A1 | 12/2002 | Weir et al. |
| 2003/0016732 A1 | 1/2003 | Miklos et al. |
| 2003/0050927 A1 | 3/2003 | Hussam |
| 2003/0073065 A1 | 4/2003 | Riggs |
| 2003/0074320 A1 | 4/2003 | Riggs |
| 2003/0095102 A1 | 5/2003 | Kraft et al. |
| 2003/0153263 A1 | 8/2003 | Glass et al. |
| 2003/0153321 A1 | 8/2003 | Glass et al. |
| 2003/0153347 A1 | 8/2003 | Glass et al. |
| 2003/0198932 A1 | 10/2003 | Stuppy |
| 2003/0236891 A1 | 12/2003 | Glass et al. |
| 2004/0009461 A1 | 1/2004 | Snyder |
| 2004/0018479 A1 | 1/2004 | Pritchard et al. |
| 2004/0027377 A1 | 2/2004 | Hays et al. |
| 2004/0030697 A1 | 2/2004 | Cochran et al. |
| 2004/0033478 A1 | 2/2004 | Knowles et al. |
| 2004/0034816 A1 | 2/2004 | Richard |
| 2004/0072136 A1 | 4/2004 | Roschelle et al. |
| 2004/0115608 A1 | 6/2004 | Meyer et al. |
| 2004/0117354 A1 | 6/2004 | Azzaro et al. |
| 2004/0127208 A1 | 7/2004 | Nair et al. |
| 2004/0161728 A1 | 8/2004 | Benevento |
| 2004/0203563 A1 | 10/2004 | Menard |
| 2004/0205818 A1 | 10/2004 | Saruhashi et al. |
| 2004/0209634 A1 | 10/2004 | Hrastar |
| 2004/0219493 A1 | 11/2004 | Phillips |
| 2004/0229642 A1 | 11/2004 | Derks et al. |
| 2004/0248074 A1 | 12/2004 | Hoyashita et al. |
| 2005/0003338 A1 | 1/2005 | Norcott et al. |
| 2005/0070294 A1 | 3/2005 | Lyle et al. |
| 2005/0086261 A1 | 4/2005 | Mammone |
| 2005/0223315 A1 | 10/2005 | Shimizu et al. |
| 2005/0245295 A1 | 11/2005 | Lee et al. |
| 2005/0282535 A1 | 12/2005 | Chmaytelli et al. |
| 2005/0283723 A1 | 12/2005 | Fish |
| 2005/0287981 A1 | 12/2005 | Hill |
| 2006/0057550 A1 | 3/2006 | Sahashi |
| 2006/0111103 A1 | 5/2006 | Jeong et al. |
| 2006/0183477 A1 | 8/2006 | Bocking et al. |
| 2006/0189311 A1 | 8/2006 | Cromer et al. |
| 2006/0204944 A1 | 9/2006 | Preskill |
| 2006/0294216 A1 | 12/2006 | Swanson et al. |
| 2007/0196808 A1 | 8/2007 | Call |
| 2008/0005101 A1 | 1/2008 | Chandra |
| 2008/0016091 A1 | 1/2008 | Chandra |
| 2008/0027933 A1 | 1/2008 | Hussam |
| 2008/0052754 A1 | 2/2008 | Iga |
| 2008/0131863 A1 | 6/2008 | Stuppy |
| 2008/0168146 A1 | 7/2008 | Fletcher |
| 2008/0288862 A1 | 11/2008 | Smetters et al. |
| 2009/0282087 A1 | 11/2009 | Muller et al. |
| 2009/0287646 A1 | 11/2009 | Maciocci |
| 2009/0319910 A1 | 12/2009 | Escapa et al. |
| 2010/0092095 A1 | 4/2010 | King et al. |
| 2010/0151431 A1 | 6/2010 | Miller |
| 2010/0262659 A1 | 10/2010 | Christiansen et al. |
| 2010/0287236 A1 | 11/2010 | Amento et al. |
| 2010/0306698 A1 | 12/2010 | Sellers et al. |
| 2010/0318893 A1 | 12/2010 | Matthews et al. |
| 2011/0035329 A1 | 2/2011 | Delli Santi et al. |
| 2011/0083090 A1 | 4/2011 | Gwiazda et al. |
| 2011/0129808 A1 | 6/2011 | Srivastava |
| 2011/0175855 A1 | 7/2011 | Youn et al. |
| 2011/0246574 A1 | 10/2011 | Lento et al. |
| 2011/0264649 A1 | 10/2011 | Hsiao et al. |
| 2012/0036423 A1 | 2/2012 | Haynes et al. |
| 2012/0109836 A1 | 5/2012 | Chen et al. |
| 2012/0151351 A1 | 6/2012 | Kilroy et al. |
| 2012/0244510 A1 | 9/2012 | Watkins, Jr. |
| 2012/0324392 A1 | 12/2012 | Mbenkum et al. |
| 2012/0329029 A1 | 12/2012 | Rauta |
| 2013/0013812 A1 | 1/2013 | Kessel et al. |
| 2013/0019175 A1 | 1/2013 | Kotler et al. |
| 2013/0040277 A1 | 2/2013 | Linton et al. |
| 2013/0042007 A1 | 2/2013 | Linton et al. |
| 2013/0047115 A1 | 2/2013 | Migos et al. |
| 2013/0104028 A1 | 4/2013 | Murray et al. |
| 2013/0111363 A1 | 5/2013 | Linton |
| 2013/0189666 A1 | 7/2013 | Nolasco |
| 2013/0198273 A1 | 8/2013 | Vago et al. |
| 2013/0295535 A1 | 11/2013 | Levy et al. |
| 2014/0006517 A1 | 1/2014 | Hsiao et al. |

(56) References Cited

U.S. PATENT DOCUMENTS

| | | |
|---|---|---|
| 2014/0038163 A1 | 2/2014 | Karpoff et al. |
| 2014/0068507 A1 | 3/2014 | Nam et al. |
| 2014/0101527 A1 | 4/2014 | Suciu |
| 2014/0101780 A1 | 4/2014 | Zuber |
| 2014/0108921 A1 | 4/2014 | Chen et al. |
| 2014/0162243 A1 | 6/2014 | Lamkin |
| 2014/0184531 A1 | 7/2014 | Demiya |
| 2014/0210860 A1 | 7/2014 | Caissy |
| 2014/0234824 A1 | 8/2014 | Schepman et al. |
| 2014/0242565 A1 | 8/2014 | Abts |
| 2014/0310305 A1 | 10/2014 | Christiansen et al. |
| 2014/0317488 A1 | 10/2014 | Lutz |
| 2015/0058716 A1 | 2/2015 | Boothman et al. |
| 2015/0187225 A1 | 7/2015 | Worsley |
| 2015/0212707 A1 | 7/2015 | Norwood |
| 2015/0220227 A1 | 8/2015 | Landau |
| 2015/0286636 A1 | 10/2015 | Elkhou et al. |
| 2015/0350151 A1 | 12/2015 | Graham et al. |
| 2015/0381722 A1 | 12/2015 | Lam et al. |
| 2016/0071424 A1 | 3/2016 | Harney et al. |
| 2016/0224896 A1 | 8/2016 | Pinel |
| 2017/0076620 A1 | 3/2017 | Thompsen Primo |
| 2019/0087414 A1 | 3/2019 | Narayanan |
| 2020/0258420 A1 | 8/2020 | Kurani |
| 2020/0302296 A1 | 9/2020 | Miller |
| 2021/0118317 A1 | 4/2021 | Angel |
| 2022/0301087 A1 | 9/2022 | Covell |
| 2022/0350809 A1 | 11/2022 | Bradley |

FOREIGN PATENT DOCUMENTS

| | | |
|---|---|---|
| EP | 1337127 A1 | 8/2003 |
| EP | 1351145 A1 | 10/2003 |
| EP | 1427228 A2 | 6/2004 |
| GB | 2375014 A | 10/2002 |
| GB | 2587094 A | 3/2021 |
| WO | 9806210 A1 | 2/1998 |
| WO | 2004031488 A2 | 4/2004 |
| WO | 2005039146 A2 | 4/2005 |

OTHER PUBLICATIONS

Aymerich et al., "An automatic assessment system supporting computer science entrance examinations," Advanced Learning Technologies, 2004. Proceedings. IEEE International Conference on Joensuu, Finland Aug 30-Sep. 1, 2004, Piscataway, NJ USA, IEEE, DD. 657-659 (Aug. 30, 2004).

Bradlow, A., Pisoni, D., Akahane-Yamada, R., Tokhura, Y. (1997). Training Japanese listeners to identify English /r/ and /l/: IV. Some effects of perceptual learning on speech production. Journal of the Acoustical Society of America. pp. 2299-2310 an Abstract of article.

Bradlow, Pisoni, Yamada, Tohkura, Acquisition of the English /r/-/l/ Contrast by Japanese Speakers: Effects of Training in Perception on Production. ICPhS 95 Stockholm, vol. 4 pp. 562-565, session 85.2. Summary.

Chen et al., "Task-oriented modelling of autonomous decentralised systems," Autonomous Decentralized Systems, 2000. Proceedings. 2000 International Workshop on Chengdu, China Sep. 21-23, 2000, Los Alamitos, CA, USA, IEEE Comput. Soc., US, pp. 172-179 (Sep. 21, 2000).

"Cortez et al., ""Teaching Science with Mobile Computer Supported Collaborative Learning (MCSCL),"" Wireless and Mobile Technologies in Education, 2004, Proceedings. The 2 IEEE International Workshop on Jungli, Taiwan, Mar. 23-25, 2004, Los Alamitos, CA, USA, IEEE Comput. Soc., US, pp. 67-74 (Mar. 23, 2004)".

Cristea et al., "Intelligent E-learning environments architecture and basic tools," Information Technology Based Higher Education and Training, 2004. ITHET 2004. Proceedings of the Fifth International Conference on Istanbul, Turkey May 31-Jun. 2, 2004, Piscataway, NJ, USA, IEEE, pp. 610-615 (May 31, 2004).

Digiano et al., "Collaboration Design Patterns: Conceptual Tools for Planning for The Wireless Classroom," Wireless and Mobile Technologies in Education, 2002, Proceedings, IEEE International Workshop on Aug. 29-23, 2002, Piscataway, NJ, USA, IEEE, pp. 39-47 (Aug. 29, 2002).

Extended European Search Report for European Patent Application No. 13793624.1 dated Jan. 18, 2016, 8 pgs.

Genesee, F. (2000). Brain Research: Implications for Second language Learning. ERIC Digest, EDO-FL•-00-12 (Dec. 2000). 1-5.

International Search Report and Written Opinion for International Application No. PCT/US2017/026861, mailed Jun. 19, 2017, 18 pgs.

International Search Report and Written Opinion, PCT/US2013/042758, mailed Nov. 12, 2013 (11 pages).

International Search Report and Written Opinion, PCT/US2014/53600, mailed Aug. 29, 2014 (10 pages).

Kanter, "An Open Service Architecture for Adaptive Personal Mobile Communication," IEEE Personal Communications, IEEE Communications Society, US, 8 (6), pp. 8-17 (Dec. 2001).

Kopp et al., "Security Architecture for Service-Based Mobile Environments," Pervasive Computing and Communications Workshops, 2005, Percom 2005 Workshops, Third IEEE International Conference on Kauai Island, Hi, USA Mar. 8-12, 2005, Piscataway, NI, USA, IEEE, DD. 199-203 (Mar. 8, 2005).

Lively, S., Logan, J., Pisoni, D. (1993). Training Japanese listeners to identify English /I and II. The role of phonetic environment and talker variability in learning new perceptual categories. Journal of the Acoustical Society of America, 94, 1242-1255.

Manguson, J., Yamada, R., Tohkura, Y., Pisoni, D., Bradlow, A. (1995). The role of talker variability innonnative phoneme training. Paper presented at the Spring Meeting of the Acoustical Society of Japan.

Maye, J. G.L. (2000). Learning phonemes without minimal pairs. Paper presented at the 24 Annual Boston University Conference on Language Development. Mar. 2000.

Nagaraja et al., "Evaluating the impact of communication architecture on the performability of cluster-based services," High-Performance Computer Architecture, 2003. HPCA-9 2003. Proceedings. The Ninth International Symposium on Feb. 8-12, 2003, Piscataway, NJ, USA, IEEE, pp. 229-240 (Feb. 8, 2003).

Renaissance Learning, Inc., "Renaissance Special Report: The Renaissance Mastery Model," 2006, 5 pgs.

Richards, J., Platt. J., Platt, H. (1992). Dictionary of Language Teaching Applied Linguistics: Longman. pp. 386, 387 and pp. 392, 393.

Sterritt et al., "Personal autonomic computing self-healing tool," Engineering of Computer-Based Systems, 2004. Proceedings. 11" IEEE International Conference and Workshop on the Brno, Czech Republic May 24-27, 2004, Piscataway, NJ, USA, IEEE, DD. 513-520 (May 24, 2004).

Sun et al., "Design and implementation of Java-based HTTP input channel for integrated WLAN and GPRS networks," Networks, 2004 (Icon 2004). Proceedings. 12" IEEE International Conference on Singapore Nov. 16-19, 2004, Piscataway, NJ, USA, IEEE, US, DD. 258-262 (Nov. 16, 2004).

Truscott, J. (1998). Instance theory and universal grammar in second language research. Second Language Research, 14(3), 257-291.

Wang, "Context Awareness and Adaptation in Mobile Learning," Wireless and Mobile Technologies in Education, 2004, Proceedings, The 2" IEEE International Workshop on Jungli, Taiwan, Mar. 23-25, 2004, Los Alamitos, CA, USA, IEEE Comput. Soc., US, pp. 154-158 (Mar. 23, 2004).

Yatani et al., "Musex: A System for Supporting Childrens Collaborative Learning in a Museum with PDAS," Wireless and Mobile Technologies in Education, 2004, Proceedings, The 2" IEEE International Workshop on Jungli, Taiwan, Mar. 23-25, 2004, Los Alamitos, CA, USA, IEEE Comput. Soc., US, pp. 109-112 (Mar. 23, 2004).

Lu, Min, "Research on Content and Mode Recommendation of Humanistic Quality Education for Science and Engineering Stu-

(56) References Cited

OTHER PUBLICATIONS dents Based on Collaborative Filtering Algorithm." 2021 IEEE Conference on Telecommunications, Optics and Computer Science (TOCS) (Year: 2021), 9 pgs.

Understanding TCP/IP, Cisco Internetworking Basics (2002) Cisco Systems, Inc, 7 pgs.

MULTI-LINGUAL TOGGLE SYSTEM WITH TRANSFERABLE SKILLS, COURSE MAPPING AND TRANSLANGUAGING CAPABILITIES ACROSS GLOBAL AND REGIONAL EDUCATIONAL JURISDICTIONS

CROSS REFERENCE TO RELATED APPLICATIONS

This application claims priority under 35 USC § 119(e) to the provisional U.S. Application No. 63/484,125 titled "Multi-Lingual Toggle System with Transferable Skills, Course Mapping and Translanguaging Capabilities Across Global and Regional Educational Jurisdictions," filed on, Feb. 9, 2023, wherein the entirety of the provisional application is herein incorporated by reference.

BACKGROUND

1. Field of the Invention

The present invention relates to systems and methods to facilitate online education and learning. More particularly, the present invention relates to a Multi-Lingual Toggle ("MLT") system with an integrated architecture to facilitate transferable skills and course mapping across global and regional education and jurisdictions. The MLT system creates a dynamic platform to elevate the instructional process, at any level (e.g., district, state, national, or global) and to integrate assessment, teaching, and learning-solution operations for students, educators, and all others involved in the educational environment. The MLT system tracks holistic and longitudinal growth towards developing a multiliterate brain.

2. Description of the Related Art

With digital instruction on the rise, within the last twenty years if not more, there are many different types of educational materials, courses, and curriculums in effect nationally and globally. Each of these can differ in content and language, making it cumbersome to co-relate. The pandemic accelerated the need for a new learning experience online. The shift to more interactive and diverse learning models will likely only continue. It recentered institutions to think about how they will teach moving forward and has brought synchronous learning into focus. Existing digitization of the classroom learning experience is seeing growing pains, especially in the realm of synchronizing course work and transferring skills into different languages, across regional and global educational jurisdictions.

As is well known, in the United States and other countries, education is a state function. The landscape of education in the United States is characterized by diversity. This includes diversity in the socioeconomic backgrounds of students, curricula, types of programs, size of classes, and resources available to the schools. This diversity is generated, in part, by a tradition of local control of schools by boards of education, which are composed of members chosen through local elections, and it is these boards of education that bear the responsibility for overseeing the funding of schools. The resources available to schools depend on the size of the local tax base and the willingness of local residents to approve increases in funding for schools.

The typical public schools in the United States have three levels: elementary, junior high, and senior high. A composite profile representing typical schools does not exist. Different schools adopt curriculum standards or guidelines proposed by state departments of education, rather than by a national body. One exception is the influential set of national guidelines developed by the National Council of Teachers of Mathematics ("NCTM"). Many schools have used these guidelines to upgrade their mathematics curriculum and have enthusiastically embraced the NCTM guidelines. These guidelines describe the accomplishments that would be expected of students at various grade levels. In addition, a set of national education goals, known as Goals 2000, has served to provide goals to be attained by the nation in the next several years. It should be recognized that "standards" represent established levels of achievement; in other instances, it may represent commonly shared sets of academic subject content, such as those embodied in state curriculum guidelines.

Curriculum guidelines in particular have been used to set standards in many states and have been linked to state-administered achievement tests. However, any discussion of standards in the United States must also include a description of the more informal mechanisms by which schools maintain and promote desired levels of achievement. Achievement levels for schools and for students have traditionally been set by community expectations, and communities continue to influence curriculum and instructional decisions made at the school level. Standards, therefore, are also a result of local decisions, such as those governing the selection of textbooks and those affecting a school's policy on the promotion or retention of students.

Many factors contribute to decisions regarding the development and implementation of curriculum in schools in the United States. Some of these factors may include whether the state or district (or both) have developed curriculum guidelines and whether the state and local guidelines are in accord with each other. Another possible factor is whether the state or district mandates that the schools follow these guidelines or allows them to develop their own curriculum. Additionally, schools that retain local autonomy over curricular decisions may choose either to adopt or ignore state or district guidelines. This choice is likely to be influenced by the school's history of achievement, community standards, financial resources, and its perception of these factors in relation to the curriculum guidelines being provided by the state or district. For example, principals and teachers at schools that consistently scored well above the mean on state assessment tests said that the state curriculum guidelines were not relevant to curriculum development in their school. They viewed the state curriculum guidelines as setting minimum achievement levels rather than a challenge or goal. On the other hand, we found that principals at schools where students were consistently performing below the mean on the state assessment test hoped to bring their school's curriculum into greater alignment with state guidelines. Meeting the state curriculum guidelines was a goal for these schools, and the mechanism by which they often chose to achieve it was through the use of textbooks that incorporated topic areas assessed by the state standardized assessment test.

Some schools may develop their curriculum independently of a textbook series. Teachers may actively partake in the ongoing evaluation and revision of curriculum and utilize various materials, programs, activities, and strategies to implement the following goals. Another factor that influenced curriculum implementation in schools, primarily at the elementary and middle schools, was the number of students requiring bilingual education. Several of the schools visited enrolled large populations of students who are developing English as an additional language. These schools provided bilingual curriculum for students whose goal is to develop multiliteracy in two or more languages.

Middle schools and high schools usually offered courses with varying levels of difficulty for core academic subjects, such as math and science. Curriculum content in these courses reflected different achievement expectations and, as a result, also reflected the diversity of a school's academic standards. Schools with the most highly stratified course offerings typically provided a very rigorous curriculum in their advanced-level courses. It is clear that as the digital universe of educational content expands and the complexity of digital curriculums increases, the teaching and learning exercises have only become more challenging.

It should be recognized that education systems all over the world vary. Each country bases its education based on cultural and historical perspectives. With increased diversity, children speak different languages. Accordingly, bilingual and multi-lingual education is becoming common, requiring advanced educational frameworks. These require schooling for emerging bilingual or multilingual children, which can only be accomplished via programs that develop biliteracy and multiliteracy through conducting literacy instruction in different languages as well as English, attending to the quality of instruction, and planning instruction to include direct and explicit attention to cross-language connections. Accordingly, the language for instruction must include other languages (e.g., Spanish or another language) in addition to English, and that instruction in these languages is planned in purposeful and intentional ways to create trajectories toward biliteracy and multiliteracy. In one prior art scenario, the "Literacy Squared" model developed by Dr. Escamilla includes authentic instructional approaches in Spanish and English that respect and focus on the internal structures of each of the languages, emphasizing direct, explicit, and collaborative instructional approaches that have proven to be beneficial for emerging bilingual children. Instruction is planned to include direct and explicit attention to cross-language connections, which enables children to learn how to use both of their languages in strategic ways to enhance their biliteracy development.

Another concept called "translanguaging" is a theoretical lens that offers a different view of bilingualism and multilingualism. This theory rests on the belief that rather than possessing two or more autonomous language systems, as has been traditionally believed, bilinguals, multilinguals, and in fact, all users of language, select and deploy particular features from a unitary linguistic repertoire to make meaning and to negotiate particular communicative contexts. Translanguaging also represents an approach to language pedagogy that affirms and leverages students' diverse and dynamic language practices in teaching and learning. Research by Dr. Ofelia Garcia at City University of New York, published in a research paper with Sara Vogel, in December of 2017, is incorporated herein by reference.

The use of translanguaging in education has created the most interest, and yet the most disagreement. In education, translanguaging theory has proved fertile, yet formal educational environments throughout the world tend to uphold structuralist notions of language use. Throughout the world, educators, school leaders, and policymakers continue to view bilingualism through subtractive or additive prisms. Yet, as globalization intensifies, and especially as more bilingual students enter schools, translanguaging is now identified as a practice in classrooms around the world. Throughout Europe, the interest in promoting "plurilingualism" for European unity as "the ability to use several languages to varying degrees and for distinct purposes" is fueling increased interest in translanguaging. Translanguaging has been identified as a practice in classrooms with immigrant and refugee students, but also in traditional language classrooms with students who want to learn additional languages.

Translanguaging pedagogy has the potential to transform relationships between students, teachers, and the curriculum. In recognizing that students come to the classroom with linguistic knowledge that teachers may not have, translanguaging necessitates a "co-learning" space where teachers and students learn from each other, and all-language practices are equally valued. Technology is becoming increasingly critical to 1) support students as they engage with and comprehend complex content and texts, 2) provide opportunities for students to develop linguistic practices for academic contexts, 3) make space for students' bilingualism and ways of knowing, and 4) support students' bilingual identities and socioemotional development.

Given the many different standards and variations, existing digital instruction technology is unable to automatically transfer skills and courses across regional and global educational jurisdictions, presenting a dire need for more solutions.

SUMMARY

The present technology created overcomes the deficiencies and limitations of prior systems and methods, at least in part by, providing an integrated and automated system with improved approaches with a multi-lingual toggle with transferable skills, course mapping and translanguaging capabilities across educational content from diverse sources.

Some embodiments of an example system and methods that enable the functionalities of the multi-lingual toggle are disclosed. This system facilitates and enhances the automated functionalities of the multi-lingual toggle to effect transfer of skills and map courses across different regional and global jurisdictions.

In some embodiments, multi-toggle system tracks student holistic and longitudinal growth towards a multiliterate brain. The multi-toggle system supports literacy education in multiple languages while respecting the differences in how literacy acquisition in each language progresses and identifying where there are opportunities to transfer learning from one language to another language.

In some embodiments, the system includes learning progressions routines developed authentically to reflect literacy acquisition in the target language. In other words, learning progressions must not be translations of literacy acquisition in English. Essential concepts and areas of learning challenge are also authentic to each language. All non-English literacy acquisition progressions are also available in an English translation of text only, not approach, to make multiliteracy accessible to students who are educationally developing in their target language.

In some embodiments, as developed, the learning progressions are also empirically validated through the application of an item response theory ("IRT") psychometric model to compute the difficulty of the skills associated with the learning progressions. There is a strong relationship between the ordering of the skills and the associated difficulties that presents an opportunity to create multilingual literacy trajectories that highlight how multilingual students achieve multiliteracy holistically, rather than in a monolingual sense.

A key component of the present system is the identification and reporting of transferable skills between languages (e.g., English and Spanish). The inclusion of transferable skills allows for the system to gauge across languages if a student is struggling with a skill or other language literacy acquisition. Transferable skills also optimize teaching time and student learning opportunities by offering the option of not teaching these skills multiple times.

In some embodiments of the present invention, the identification of transferable skills and degrees of transference, essential skills, areas of learning challenge, and even skills that appear to be the same but have different meanings (Word Families and Family of Words), are managed by a variant model that allows learning objectives and associated data to be tracked across languages.

In some embodiments, the UI design facilitates translanguaging and mirrors the environment of a multiliterate classroom by providing dynamic switching between multiple languages including recommendations, grouping, and skill instructional support explicitly designed for each language. Educators or others in the education environment can toggle between paired literacy acquisition learning objectives, by using the skill difficulty data and mastery reporting specific to each learning progression, and can access reporting to gauge where students are in their individual journeys in context of each language and ultimately toward a multiliterate reading brain.

Additional details are described below in the detailed description.

BRIEF DESCRIPTION OF THE DRAWINGS

The present invention is illustrated by way of example, and not by way of limitation in the figures of the accompanying drawings in which like reference numerals are used to refer to the same or similar elements.

FIG. 2A connects to FIG. 2B via connection designator "A" and to FIG. 2C via connection designator "B" as shown in these figures.

FIG. 2B connects to FIG. 2C via connector designators "C" and "D."

FIG. 2C connects to FIG. 2D via connector designators "E" and "F."

FIG. 2D connects to FIG. 2E via connector designator "F."

FIG. 2E connects to FIGS. 2C and 2D via connector designators "B," "E," and "F."

DETAILED DESCRIPTION

Figure 1:
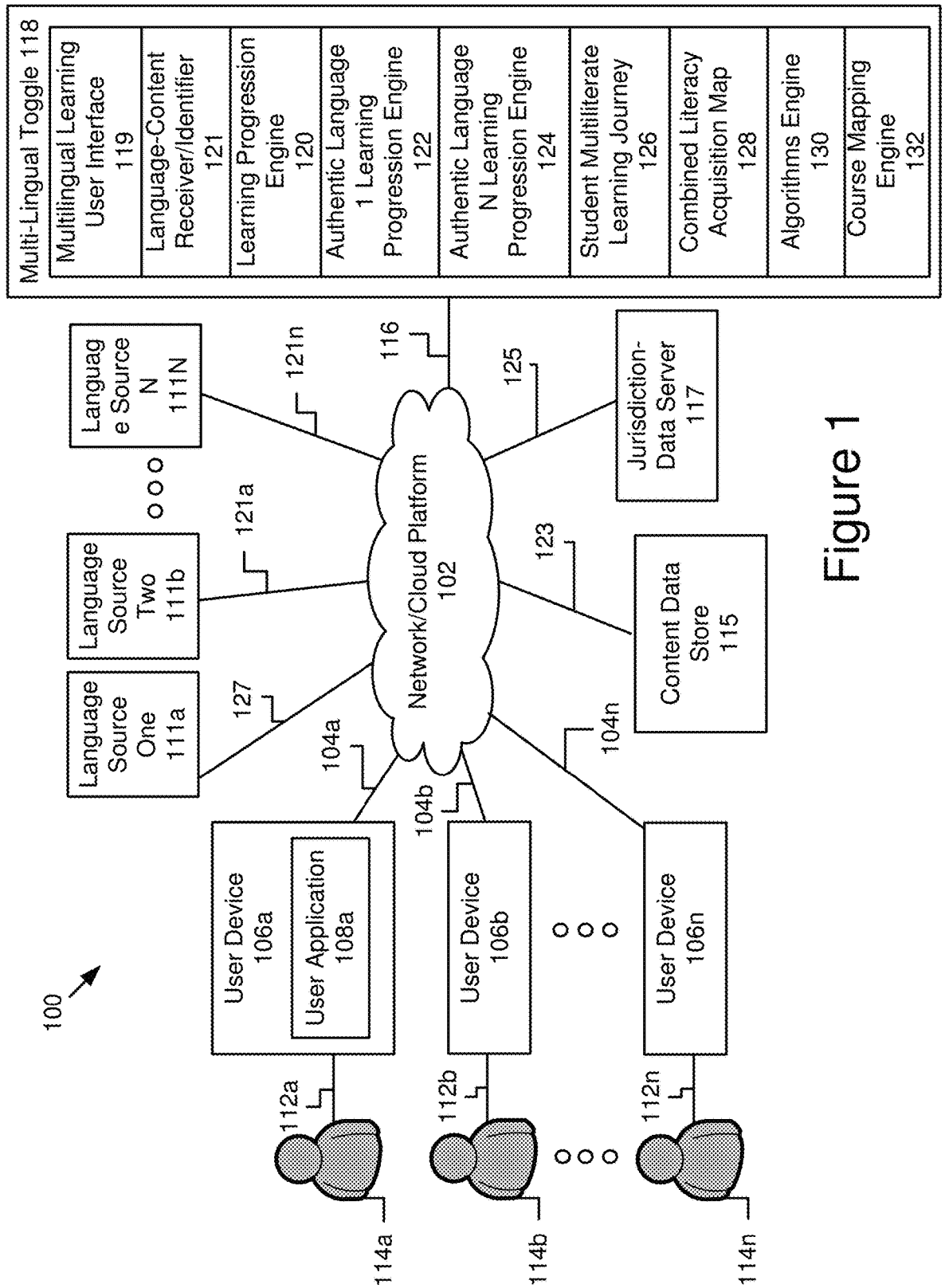
FIG. 1 is a high-level block diagram illustrating a distributed environment in which user devices for use by users (e.g., students, teachers, educators or the like) are coupled by communication networks with the multi-lingual toggle system of the present invention.

The systems and methods of this technology provide integrated and automated solutions to enhance the learning environment. The present invention is a multi-lingual toggle (MLT) system with transferable skills course mapping and translanguaging capabilities across global and regional educational jurisdictions 118 illustrated in a distributed environment represented generally by reference numeral 100. The multi-lingual toggle system 118 enables functionalities that effect seamless transfer of skills and mapping of educational content from diverse sources in different regions. The MLT system 118 tracks student holistic and longitudinal growth towards developing a multiliterate brain. The MLT system 118 supports literacy education in multiple languages while respecting the differences in how literacy acquisition in each language progresses and identifying where there are opportunities to transfer learning from one language to another language. It includes learning progressions routines that are developed authentically to reflect literacy acquisition in the target language. In other words, learning progressions must not be mere translations of literacy acquisition in English. Essential concepts and areas of learning challenge are also authentic to each language. All non-English literacy acquisition progressions are also available in an English translation of text only, not approach, to make multiliteracy accessible to students who are developing the target language.

The learning progressions of the MLT system 118 are also empirically validated through the application of an item response theory ("IRT") psychometric model to compute the difficulty of the skills associated with the learning progressions. There is a strong relationship between the ordering of the skills and the associated difficulties that present an opportunity to create multilingual literacy trajectories that highlight how multilingual students achieve multiliteracy holistically, rather than in a monolingual sense.

A key component of the present MLT system 118 is the identification and reporting of transferable skills between languages (e.g., English and Spanish). The inclusion of transferable skills allows for the system to gauge across languages, if a particular student is struggling with a skill or other language literacy acquisition. Transferable skills also optimize teaching time and student learning opportunities by offering the option of not teaching these skills multiple times. In some embodiments of the present invention, identification of transferable skills and degrees of transference, essential skills, areas of learning challenge, and even skills that appear to be the same but have different meanings (e.g., word families and family of words), are managed by a variant model 256 (in FIG. 2C) that allows learning objectives and associated data to be tracked across languages. It should be recognized by those skilled in the art that the variant model 256 (FIG. 2C) may be configured as a template with model blocks to represent the variant choices. The variant model block allows a combination of subsystem blocks, model blocks, or subsystem reference blocks as variant choices.

The user interface ("UI") design (for the multilingual learning user interface 119) facilitates translanguaging and mirrors the environment of a multiliterate classroom by providing dynamic switching between multiple languages including recommendations, grouping, and skill instructional support explicitly designed for each language. Educators or others in the education environment can toggle between paired literacy acquisition learning objectives, by using the skill difficulty data and mastery reporting specific to each learning progression, and can access reporting to gauge where students are in their individual journeys in context of each language and ultimately toward a multiliterate reading brain.

FIG. 1 illustrates the general distributed environment (e.g., cloud-based or a client-server architecture or an environment in which parts of all of the innovative technology described here may be implemented in devices or applications) as designated generally by reference numeral 100, with users designated by reference numerals 114a, 114b, through 114n, who may be students, teachers, administrators, educators, or anyone in the educational environment (a state, provenance, agency, department, district, dioecy, federal etc.), using user devices, designated by reference numerals 106a, 106b, through 106n. In some embodiments, the user devices 106a-106n are configured to interact with the MLT system 118, via a network 102 (e.g., a cloud platform). Each of the user devices 106a-106n may have a user application 108a (illustrated only in user device 106a as one example) configured to operate and perform the functions of the innovative technology. User communications or input actions flow via lines 112a, 112b, through 112n, respectively, to the user devices, 106a, 106b, through 106n, and through lines 104a, 104b, through 104n, into the network 102 (and beyond).

The network 102 may be a conventional type, wired or wireless, and may have numerous different configurations including a star configuration, token ring configuration, or other configurations. Furthermore, the network 102 may include any number of networks and/or network types. For example, the network 102 may include a local area network (LAN), a wide area network (WAN) (e.g., the Internet), virtual private networks (VPNs), mobile (cellular) networks, wireless wide area network (WWANs), WiMAX® networks, Bluetooth® communication networks, peer-to-peer networks, near field networks (e.g., NFC, etc.), and/or other interconnected data paths across which multiple devices may communicate, various combinations thereof, etc. The network 102 may also be coupled to or include portions of a telecommunications network for sending data in a variety of different communication protocols. In some implementations, the network 102 may include Bluetooth communication networks or a cellular communications network for sending and receiving data including via short messaging service (SMS), multimedia messaging service (MMS), hypertext transfer protocol (HTTP), direct data connection, WAP, email, etc. In some implementations, the data transmitted by the network 102 may include packetized data (e.g., Internet Protocol (IP) data packets) that is routed to designated computing devices coupled to the network 102. Although FIG. 1 illustrates one network 102 coupled to the user devices 106a-106n, the MLT system 118, the plurality of E-content data sources 111a-111n, the content data store 115, and the jurisdiction-data server 117, in practice one or more networks 102 can be connected to these entities.

The user devices 106a-106n (also referred to individually and collectively herein as 106) may be computing devices having data processing and communication capabilities. In some implementations, a user device 106 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The user devices 106a-106n may couple to and communicate with one another and the other entities of the system 100 via the network 102 using a wireless and/or wired connection. Examples of user devices 106 may include, but are not limited to, laptops, desktops, tablets, mobile phones (e.g., smartphones, feature phones, etc.), server appliances, servers, virtual machines, smart TVs, media streaming devices, user wearable computing devices or any other electronic device capable of accessing a network 102. In the example of FIG. 1, the user device 106a is configured to implement an integrated user application 108a integrated with the automated multi-lingual toggle system 118 described in more detail below. The user device 106 includes a display (FIG. 3 and FIG. 9) for viewing information provided by one or more entities coupled to the network 102. For example, the user device 106 may be adapted to send and receive data to and from the integrated automated multi-lingual toggle server 118. While two or more user (also referred to as client) devices 106 are depicted in FIG. 1, the system 100 may include any number of user devices 106. In addition, the user devices 106a-106n may be the same or different types of computing devices. The user devices 106a-106n may be associated with the users 114a-114n to receive their input as illustrated by signal line 112a-112n. For example, users 106a-106n may include students, educators, teachers, administrative staff, and others in the educational environment. Each user device 106 may be associated with a data channel, such as a mobile application running on a user's smartphone, a computer in a school office, an administrator or assessment tracking device, etc. These data channels may collect data related to one or more users and provide that data to the entities coupled to the network 102. In some implementations, the user devices 106 may be implemented as a computing device as will be described below.

Figure 3:
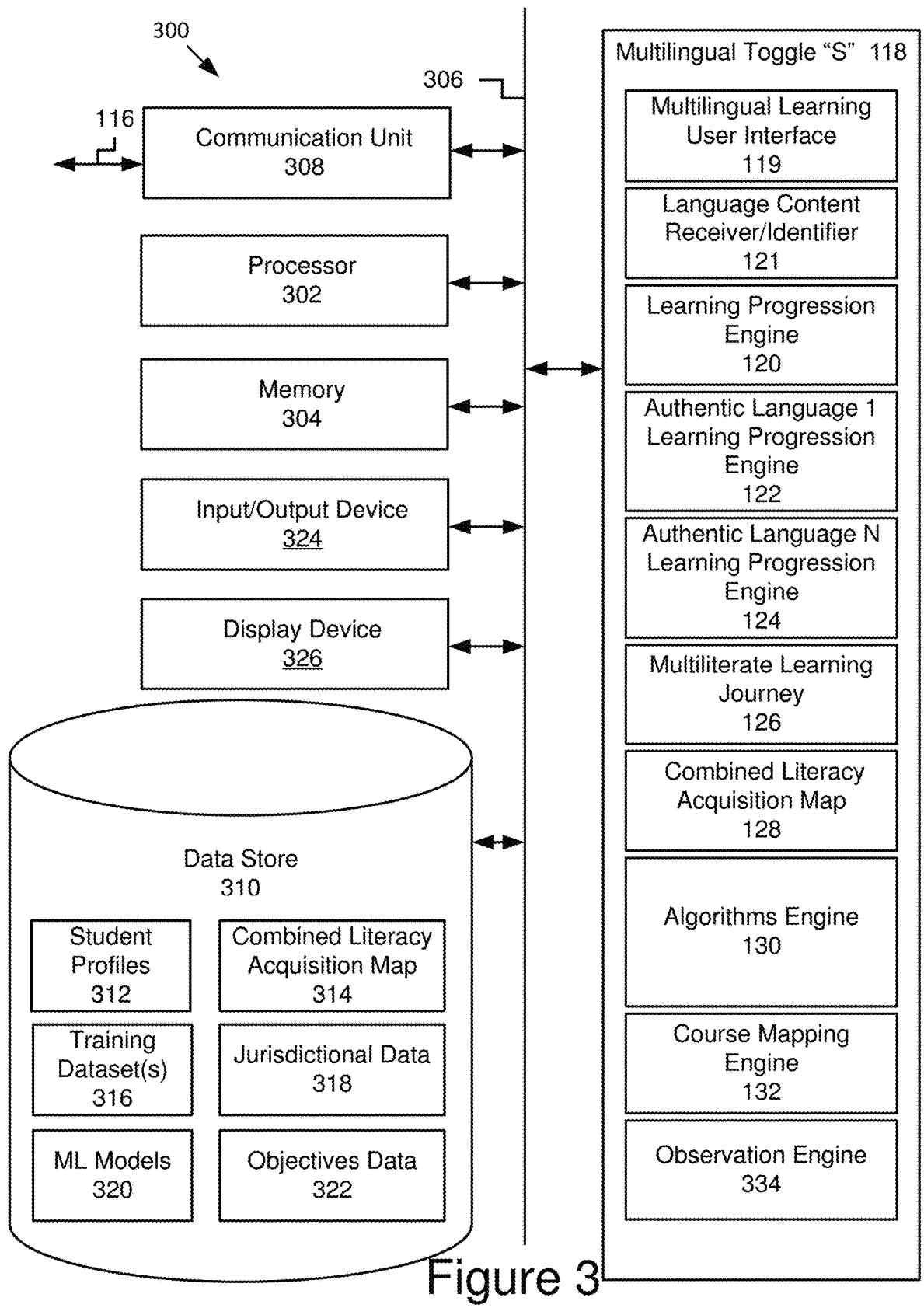
FIG. 3 is a block diagram illustrating an example configuration of the multi-lingual toggle system and its various components.

In some embodiments, user input may interact through line 116 with the multi-lingual toggle system 118. The multi-lingual toggle system 118 integrates one or more functionalities of various sub-systems, including but not limited to, a multi learning multilingual learning user interface 119, a language-content receiver/identifier 121 (configured to either identify or access particular content in a particular language), a learning progression engine 120, an authentic language 1 learning progression engine 122, an authentic language N learning progression engine 124, a student multiliterate learning journey 126, a combined literacy acquisition map 128, an algorithms engine 130, and a course mapping engine 132. Referring also to FIG. 3, access to each of these subsystems or engines is accomplished via an observation engine 334, which is a part of the multilingual multilingual learning user interface 119 (FIG. 1). The observation engine 334 is configured to show different and dynamic views via a display unit of the user devices 106a-106n. The design of the user interface 119 mirrors the environment of a multiliterate classroom by providing dynamic switching between multiple languages including recommendations, grouping, skill instructional support explicitly designed for each language. Educators may toggle between paired literacy learning objectives, and by using the skill difficulty data and mastery reporting specific to each learning progression, they may access reporting to gauge where students are in their individual journeys in context of each language and ultimately toward developing a multiliterate reading brain.

The multi-lingual toggle system 118 facilitates digital reading and enables collaboration in and with the pages of digital books, articles, and documents. In some implementations, the text of interest or display may be for assessment, lesson planning, or any other task described herein. In some examples, the text may be the text content on a page of a digital book available on the web or downloaded as an ePub (electronic publication) or PDF (portable document format). The automated multi-lingual toggle system 118 has access to diverse educational content from global sources. It is well known that as geographical regions differ, the education system in different countries differs. Every country has a different approach to education and ideas of the best philosophy for schools and students can vary quite significantly across the globe. For example, the history and culture of a place can a huge part in what schooling means to them.

The automated multi-lingual toggle system 118 may include one or more servers with one or more processors and one or more storage devices storing data or instructions executable by the one or more processors. For example, the multi-lingual toggle system 118 may be a single server, an array of servers or any other computing device, or a group of computing devices, with data processing, storing, and communication capabilities. In some embodiments, the multi-lingual toggle system 118 may be a virtual server (i.e., a virtual machine) implemented via software. For example, the virtual server operates in a host server environment and accesses the physical hardware of the host server including, for example, a processor, memory, storage, network interfaces, etc., via an abstraction layer (e.g., a virtual machine manager). In some implementations, the multi-lingual toggle server 118 may be a Hypertext Transfer Protocol (HTTP) server, a Representational State Transfer (REST) service, or other server type, having structure and/or functionality for processing and satisfying content requests and/or receiving content from one or more of the user devices 106, and the other servers coupled to the network 102. It should be understood that the multi-lingual toggle system 118 may be made up of any combination of devices and servers, or only one device or server.

Also, instead of or in addition, the multi-lingual toggle server 118 may implement its own application programming interface (API) for transmission of instructions, data, results, and other information between the multi-lingual toggle server 118 and other entities communicatively coupled to the network 102. For example, the API may be a software interface exposed over the HTTP protocol by the integrated multi-lingual toggle server 118. The API exposes internal data and functionality of the service hosted by the integrated server 118 to API requests originating from one or more of the integrated multi-lingual toggle applications 118, the plurality of language (data) sources server 111a-n, and the plurality of third-party servers, for example, the jurisdiction-data server 117. In one example, the integrated application implemented by the integrated multi-lingual toggle server 118 passes an authenticated request including a set of parameters for information to one or more of the third-party jurisdiction-data servers 117 and the language data sources 111a-n and receives an object (e.g., XML or JSON) with associated results. In some implementations, the integrated multi-lingual toggle server 118 may also include a database coupled to it (e.g., over the network 102) to store structured data in a relational database and a file system (e.g., HDFS, NFS, etc.) for unstructured or semi-structured data. In some implementations, the integrated server 118 may include an instance of a content data store 115 that stores various types of data for access and/or retrieval by the integrated application operable on the multi-lingual toggle server 118. For example, the content data store 115 may store user data associated with various users. The user data may include a user identifier (ID) uniquely identifying the users (e.g., students, educators etc.), a user (e.g., student) profile, one or more data metrics of the users (e.g., students) corresponding to data received from one or more channels. Other types of user data are also possible and contemplated.

In some implementations, the integrated multi-lingual toggle server 118 sends and receives data to and from other entities of the system 100 via the network 102. For example, the integrated multi-lingual toggle server 118 sends and receives data including instructions to and from the user device 106. In some implementations, the integrated multi-lingual toggle server 118 may serve as a middle layer and permit interactions between the user device 106 and the plurality of the third-party servers 117 and the content data sources 111 to flow through and from the integrated multi-lingual toggleserver 118 for security and convenience. In some implementations, the integrated multi-lingual toggle server 118 may be operable to receive, store, and/or integrate variety of diverse user data, generate student scores in some instances, determine actionable program interventions using one or more trained machine learning models, automatically execute the actionable program interventions to manage student progress etc. The integrated server multi-lingual toggle 118 may send data to and receive data from the other entities of the system 100 via the network 102. It should be understood that the integrated multi-lingual toggle server 118 is not limited to providing the above-noted acts and/or functionality and may include other network-accessible services. In addition, while a single integrated multi-lingual toggle server 118 is depicted in FIG. 1, it should be understood that there may be any number of integrated servers 118 or a server cluster.

The multi-lingual toggle system 118 may interact with the user devices 106a-106n or other third-party servers, for example, a jurisdiction-data server 117 or media-distribution servers represented as Language Source One 111a, Language Source Two 111b, through Language Source N 111n. Each of the language sources have or provide access to content in a particular language (e.g., Spanish, Mandarin, German, Swahili etc.). The multi-lingual toggle system 118 may also be coupled to a Content Data Store 115, or other servers in the distributed educational system 100. All the illustrated components in the distributed environment may communicate via the network 102, or may be coupled to and interact with any of these entities via a direct data connection.

In some embodiments, the entities of the distributed system 100 including the multi-lingual toggle system 118 and the other servers may be implemented using cloud-based architectures where one or more computer functions are performed by remote computing systems and devices at the request of a local computer device. For example, a user device 106a may be a computing device having a limited set of hardware and/or software resources and may access hardware and/or software resources provided across the network 102 by other computer devices and resources, such as other user devices 106b, the jurisdiction-data server 117, the multi-lingual toggle system 118, or any other computing resources. The user device 106a may access these resources through a user application 108a, such as a web browser or customized application, and the results of any computer functions or resources may be delivered through the user application 108a to the user by the user device 106a, such as those described. Other architectures know to those skilled in the art may also be used.

In some embodiments, the multi-lingual toggle system 118 may be a cloud-based distributed computing system with dynamically scalable and virtualizable resources. In some embodiments, components of the multi-lingual toggle system 118 may be implemented on user devices. In some embodiments, the multi-lingual toggle system 118 may be implemented in a cloud and user devices. Various functionalities of the multi-lingual toggle system 118, including the functionalities of the multilingual learning user interface 119, the language-content receiver/identifier 121, learning progression engine 120, the authentic language 1 learning progression engine 122, the authentic language N learning progression engine 124, the student multiliterate learning journey 126, the combined literacy acquisition map 128, the algorithms engine 130, and the course mapping engine 132 may be carried out and supplemented by computing systems and devices distributed over the network 102. Although only one automated multi-lingual toggle system 118 is shown, multiple servers/platforms 118 may be included in the system 100 for regional or global reach or for specific purposes as desired. In some embodiments, the multi-lingual toggle system 118 may be implemented as a control tool in a user device 106a. In some embodiments, all or parts of the multi-lingual toggle system 118 may be implemented in the user device 106a.

Each of the language sources (one, two, and N as illustrated) designated by reference numerals 111a, 111b, and 111n is a computing device and/or system for transmitting or providing access to electronic resources stored in or available through the content data store 115 to the other entities in the environment 100. In some embodiments, these servers cooperate with the automated multi-lingual toggle system 118 to provide an electronic resource in a particular language (e.g., Spanish, Chinese, French or any other language) to a user 114a (e.g., teacher or student) for consumption. For example, the multi-lingual toggle may transmit or provide access to a file (e.g., a webpage) to a user device 106a for display to the user 114a. In some instances, the file may include code (e.g., a video player) executable to receive a video and/or audio stream (e.g., an electronic resource in a particular language) from the language servers (any one of language source one, two, or N illustrated) and render it for display to the user 114a. In the depicted embodiment, the content data store 115 is coupled to the network 102 via signal line 123 for communication with the other entities of the environment 100. The content data store 115 is also coupled to the language sources to access electronic resources and other data stored there. In some embodiments, the content data store 115 is a hardware server including a processor, memory, and network communication capabilities. In other embodiments, the content data server 115 is a virtual server.

In some embodiments, the content data store 115 transmits or provides access to video and audio streams to one or more user devices 106a-n. The video and audio streams may be live feeds or may be previously recorded, stored as media objects in the E-content source, and transmitted to the one or more user devices 106a-n on demand, via delayed broadcast, etc. In some embodiments, the audio and video are streamed to or from the content data store 115 via the network 102. In other embodiments, a user can download an instance of the video and audio media objects from the content data store 115 to a local repository for storage and local playback.

The content data store 115 and/or the multi-lingual toggle system 118 is/are capable of allowing access to or transmitting any number of language-specific electronic resources to any number of user devices 106a-n simultaneously. While in the illustrated embodiment, only content data store 115 is shown, any number of content data stores 115 and/or language sources 111 may be included in the distributed environment 100. For example, the content data store 115 and the language source may be a distributed server and storage system with local instances strategically located in locations where spikes in demand for the electronic resources are likely to occur. For example, if a cluster of user devices 106a-n are located in a particular geographic region, local instances of the content data store 115 and the language source may be coupled to the network 102 in that geographic region such that the media objects stored in the language source may be served locally and at a faster data rate to that cluster of user devices 106 a-n.

It should be understood that, in some embodiments, the content data store 115 and/or the jurisdiction-data server 117 have the same or similar architecture (e.g., memory, processor, communication unit, bus, etc.) as the multi-lingual toggle system 118 illustrated in FIGS. 2A-2F, and thus the description of those components applies to the language source 111a-n and/or the jurisdiction server 117.

The language source 111a-n is an information source for storing content/data and providing access to stored content/data in a particular language. The stored content/data may include the electronic resources described above, such as media objects including video, audio, vector-based files, electronic books, documents, etc. In some embodiments, the language source is included in the memory (not shown) of the content data store 115. In other embodiments the language source is included in the memory 304 (see FIG. 3) of the multi-lingual toggle system 118. In yet other embodiments, the language source is included in a server or storage system distinct from but accessible by the content data store 115 and the automated multi-lingual toggle system 118. In some embodiments, the language source includes a database management system ("DBMS") executable by a processor to manage a collection of records, files, and objects including the media objects. For example, the database could be a structured query language ("SQL") DBMS. In these embodiments, the automated multi-lingual toggle system 118 and/or the content data store 115 are coupled to a language data source 111a through 111n, via the bus 306 to store data in multi-dimensional tables having rows and columns, and manipulate, i.e., insert, query, update and/or delete, rows of data using programmatic operations (e.g., SQL queries and statements).

The jurisdiction-data server 117 may be a server hosting a network-based software application operable to provide various services or functionalities, and to send data to and receive data from the automated multi-lingual toggle system 118, the content data store 115, and the user devices 106a . . . 106n via the network 102. In the depicted embodiment, the jurisdiction-data server 117 is coupled to the network 102 via signal line 125 for communication with the other entities of the system 100. The jurisdiction-data 117 is also coupled to the content data store 115 by signal lines 125 and 123 for accessing and storing data. In some embodiments, the jurisdiction-data server 117 is a single server, an array of servers, or any other computing device, or group of computing devices, with data processing, storing and communication capabilities. In other embodiments, jurisdiction-data server 117 is a virtual server.

The jurisdiction-data server 117 may provide access to data stored in the data store 115 that is associated with users of the automated multi-lingual toggle system 118 or may couple to remote servers with data specific to educational jurisdictions, for example, the different states in the United States.

In some embodiments, the data stored in the content data store 115 may include assessment data, achievement data, student data, teacher data, standards data, course data, etc., and the jurisdiction-data server 117 may include a software application for providing secure access to this type of data by the automated multi-lingual toggle system 118 over the network 102 via an API. For example, in an educational setting, the demographics data may include instructor and pupil demographics data and may be used to discern that the programs are bi-lingual in a particular school district. This data may be segmented across any educational agency, for example a school district, a school, a classroom, a grade, etc. The achievement data may include standardized test scores of pupils for use by educators. The student data may include student assessments of teachers (e.g., aggregated from surveys, reviews, etc.), biographical data describing the students publicly shared data etc. The teacher data may include biographical data describing the teachers, teachers publicly shared data, teacher preferences, teacher assessments of students (e.g., aggregated from surveys, reviews, etc.), etc. The standards data may include standards compiled and approved by a governing organization or institution which define the levels of attainment pupils much reach to be considered acceptably educated. It should be recognized that the fifty states in the U.S. may have unique needs and standards for education. The standards may require a varying range of skills. It should also be recognized that education standards, objectives, or goals vary across countries and also regions within countries. Different standards may be based on states or districts, or alternatively, provenance, agency, department, dioecy, federal etc. There also exist international educational frameworks and organizations. For example, the International Standard Classification of Education (ISCED) is a statistical framework for organizing information on education maintained by the United Nations Educational, Scientific and Cultural Organization (UNESCO). There are efforts underway to globalize educational standards. As another example, the European Education Area fosters collaboration among the European Union Member States to build more resilient and inclusive national education and training systems. Standardizing global educational organizations and practices via management systems help manage processes and activities to meet global objectives and goals.

As an example, agencies may include the "Wisconsin Department of Public Instruction," "Kansas State Department of Education," "New York Department of Education," and so on. In some embodiments, a local instance of the data stored in the content data store 115 may be included in the data store 115. For example, a batch program operating periodically (every few minutes, hours, days, weeks, etc.) may retrieve a refreshed version of the data stored in the data store 115. In addition, data on different courses in a particular curriculum may be stored in different languages.

Figure 2A:
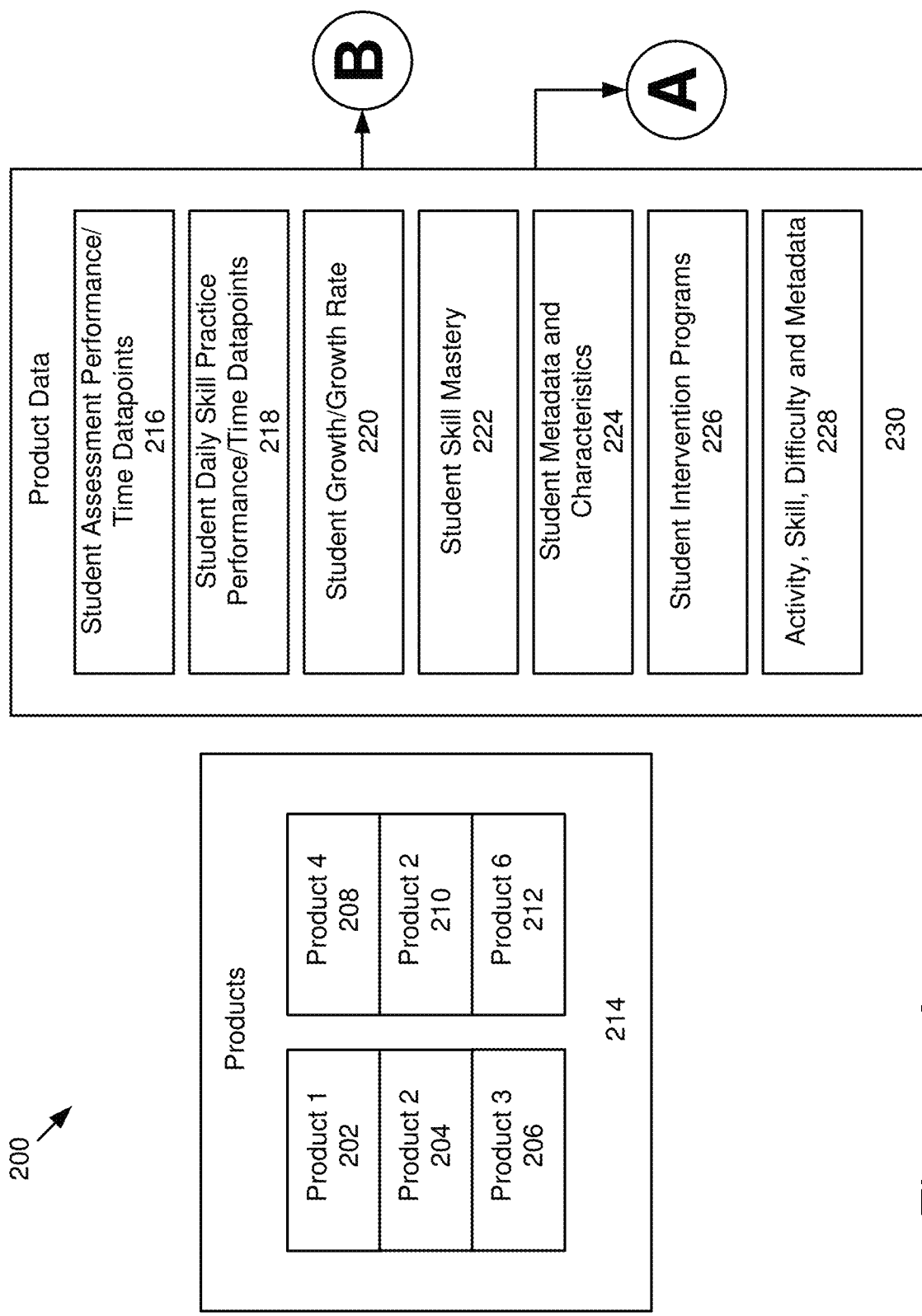
FIG. 2A is a block diagram illustrating a first example portion of the multi-lingual toggle system in accordance with the present invention, with its various sub-systems, modules, and engines illustrated in this figure and other figures (FIGS. 2B-2F).

Referring now to FIGS. 2A-2F, in particular to FIG. 2A, the multilingual toggle system 118 is illustrated in an operating educational environment represented generally by reference numeral 200. The educational content may be from diverse sources and in a multitude of different languages as illustrated. Diverse content in different languages ranging from specific questions to instructional plans may be aligned independently or through a course mapping that follows prescribed curriculums for different grades and schools. This correlation of courses in different languages (by the automated multi-lingual toggle system 118) includes jurisdiction dependent definitions of educational goals, such as standards and learning objectives. Content in different languages may be assimilated and associated metadata stored in a data store (e.g., in content data store 115).

As illustrated in FIG. 2A, examples of products with educational content may include "Product 1," "Product 2," "Product 3," "Product 4," "Product 5," and "Product 6." The products data may include Student Assessment Performance/Time Datapoints, Student Daily Skills Practice Performance/Time Datapoints, Student Growth/Growth Rate, Student Skill Mastery, Student Metadata and Characteristics, Student Intervention Programs, and Activity Skill, Difficulty, and Metadata. The educational content provided or accessed may include exercises, instructional plans or academic standards, provided via the Language Sources One, Two through N (FIG. 1). The Content Data Store 115 (FIG. 1) may comprise a language knowledge graph or course mapping graph and jurisdiction dependent definitions of educational goals. The language specific electronic content (from language sources one, two, through N in FIG. 1) may be assessed for objectives and the metadata may be stored. Referring now to FIG. 2C, a transferable skills analysis algorithm 252 comprises a language knowledge graph 258 that is configured to correlate different languages. The transferable skills analysis algorithm 252 also comprises an invariant skills module 254 and a variant model 256.

As illustrated in FIG. 2A, the product data flows to (is provided to or accessible by) the learning progression research and development engine or module 233 (part of learning progression engine 120 in FIG. 1), which is configured to perform data analysis on student skills. The product data also flows to (is provided to or accessible by) the Transferable Skills and Analysis Algorithm 252 (in FIG. 2C) and the Multiliterate Achievement and Growth Analysis Algorithm 284 (in FIG. 2E). The output from (data) the Learning Progress Research and Development engine or module 233 (in FIG. 2B) is input into the Authentic Language 1 ("L1") Learning Progression Algorithm 242 (in FIG. 2B) and the Authentic Language N (LN) Learning Progression 250 (in FIG. 2B). Learning progressions are developed authentically to reflect literacy acquisition in a target language. Learning progressions are not translations of literacy acquisition in English. Essential concepts and areas of learning challenge are also authentic to each language. All non-English literacy acquisition progressions are also available in an English translation of text only, no approach, to make multiliteracy accessible students who are educationally developing in their target language. The English jurisdiction 227 is indicative of such scenario.

Figure 2B:
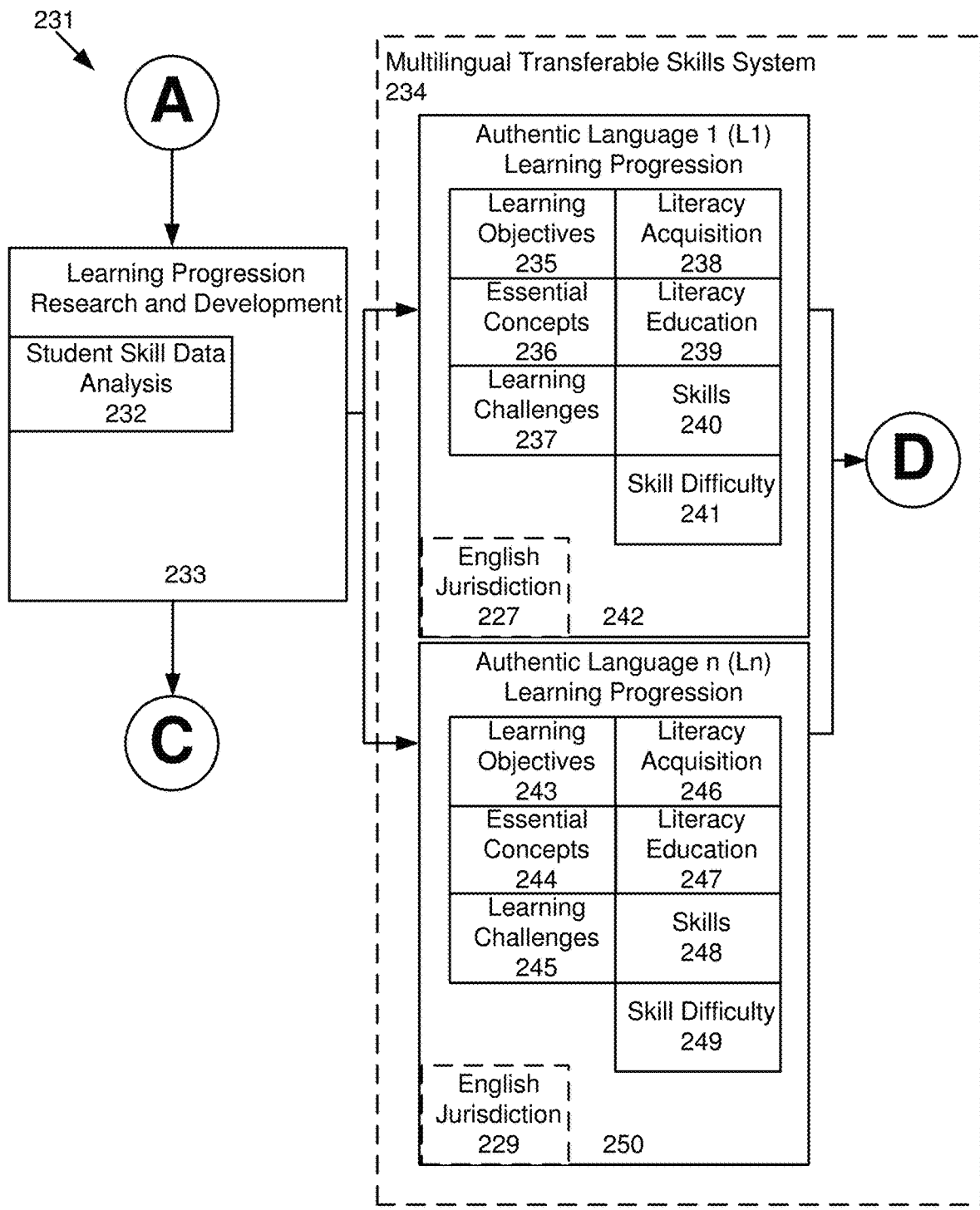
FIG. 2B is a block diagram illustrating a second example portion of the multi-lingual toggle system in accordance with the present invention, with the learning progression research and development system component and the multi-lingual transferable skills system component.
Figure 2C:
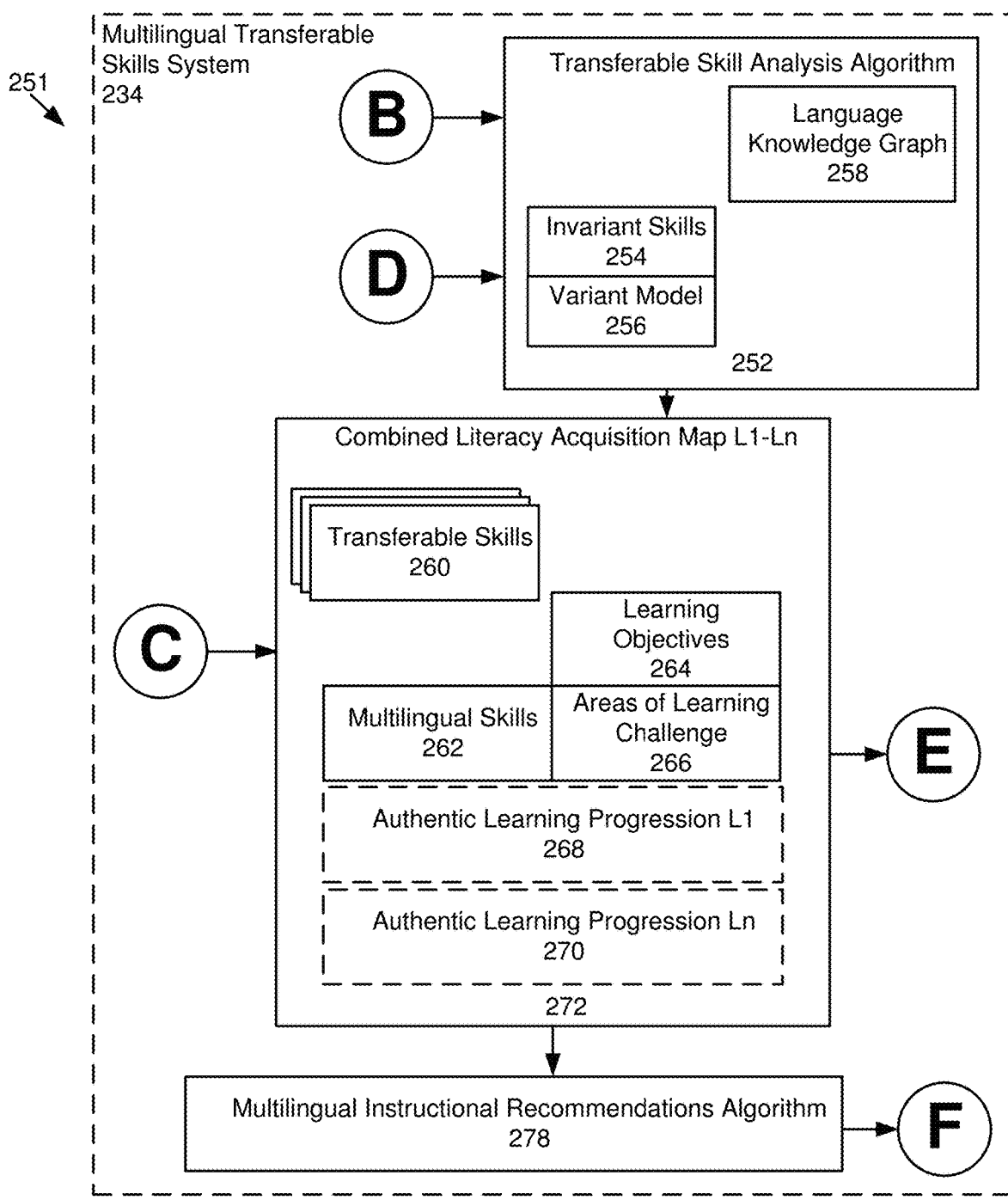
FIG. 2C is a block diagram illustrating the various example components within the multi-lingual transferable skills system in accordance with the present invention.
Figure 2D:
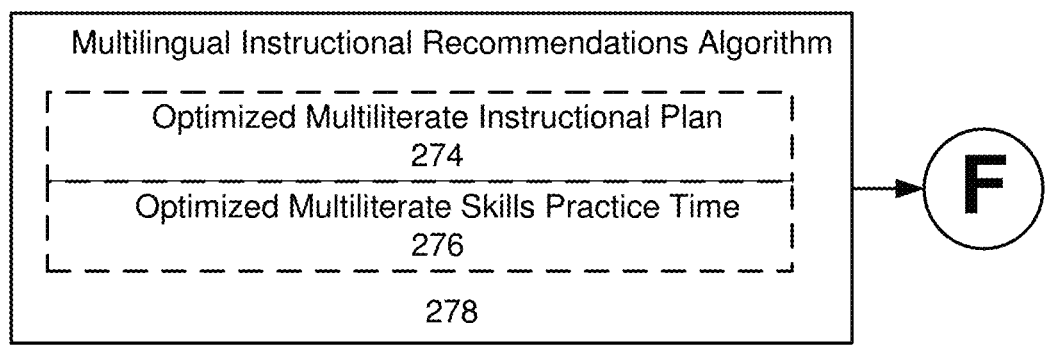
FIG. 2D is a block diagram illustrating the multilingual instructional recommendations algorithm module in accordance with the present invention.

Referring to FIG. 2B, the Authentic Language 1 ("L1") Learning Progression Algorithm 242 (in FIG. 2B) addresses a multitude of factors, including but not limited to "Learning Objectives," represented by module 235 "Essential concepts," represented by module 236, "Learning Challenges," represented by module 237, "Literacy Acquisition," represented by module 238, "Literacy Education," represented by module 239, "Skills," represented by module 240, and "Skill Difficulty," represented by module 241. The Authentic Language N ("LN") Learning Progression algorithm 250 may comprise "Learning Objectives," represented by module 243, "Essential Concepts," represented by module 244, "Learning Challenges," represented by module 245, "Literacy Acquisition," represented by module 246, "Literacy Education," represented by module 247, "Skills," represented by module 248, and "Skill Difficulty," represented by module 249. The outputs from both block of algorithms are directed to the "Transferable Skills Analysis Algorithm," represented by module 252, which may comprise a "Language Knowledge Graph," 258 "Important or Invariant Skills," represented by module 254 and a "Variant Model," represented by module 256. In some embodiments, the learning progressions generated by the learning progression engine 120 (FIG. 1) are also empirically validated through the application of an item response theory ("IRT") psychometric module to compute the difficulty of the skills associated with the learning progressions. There is a strong relationship between the ordering of the skills and the associated difficulties that presents an opportunity to create multilingual literacy trajectories that highlight how multilingual students achieve multiliteracy holistically, rather than in a monolingual sense. A key component is the identification and reporting of transferable skills between languages. The inclusion of transferable skills allows the multi-lingual system 118 to gauge across languages if a student is struggling with a skill or other language literacy acquisition. Transferable skills also optimize teaching time and student learning opportunities by offering the option of not teaching these skills multiple times. The identification of transferable skills and degrees of transference, essential skills, areas of learning challenge, and even skills that appear to be the same but have different meanings (Word Families and Family of Words), are managed by a variant model that allows learning objectives and associated data to be tracked across languages.

The output from the "Transferable Skills Analysis Algorithm" module 252 is coupled to the "Combined Literacy Acquisition Map (L1-Ln)" module 272, which has one or more transferable skills. In addition, this module 272 stores learning objectives in module 264, multilingual skills in module 262, areas of learning challenge in module 266, authentic learning progression L1 in module 268 and authentic learning progression Ln in module 270. The output from the "Combined Literacy Acquisition Map (L1-Ln)" module 272 feeds into the "Multilingual Instructional Recommendation Algorithm" module 278, which stores an "Optimized Multiliterate Instructional Map" in a module 274 (in FIG. 2D) and the an "Optimized Multiliterate Skills Practice Time" in module 276 (in FIG. 2D). The output from this module or engine 278 ("Multilingual Instructional Recommendation Algorithm") with result data flows into the "Multilingual Learning UI" module 296 (in FIG. 2E)

Output from the "Combined Literacy Acquisition Map (L1-Ln)" in module 272 (in FIG. 2C) may also feed directly into the "Multilingual Learning UI" module 296 (in FIG. 2E) and the "Multiliterate Achievement and Growth Analysis Algorithm" in module 284.

Figure 2E:
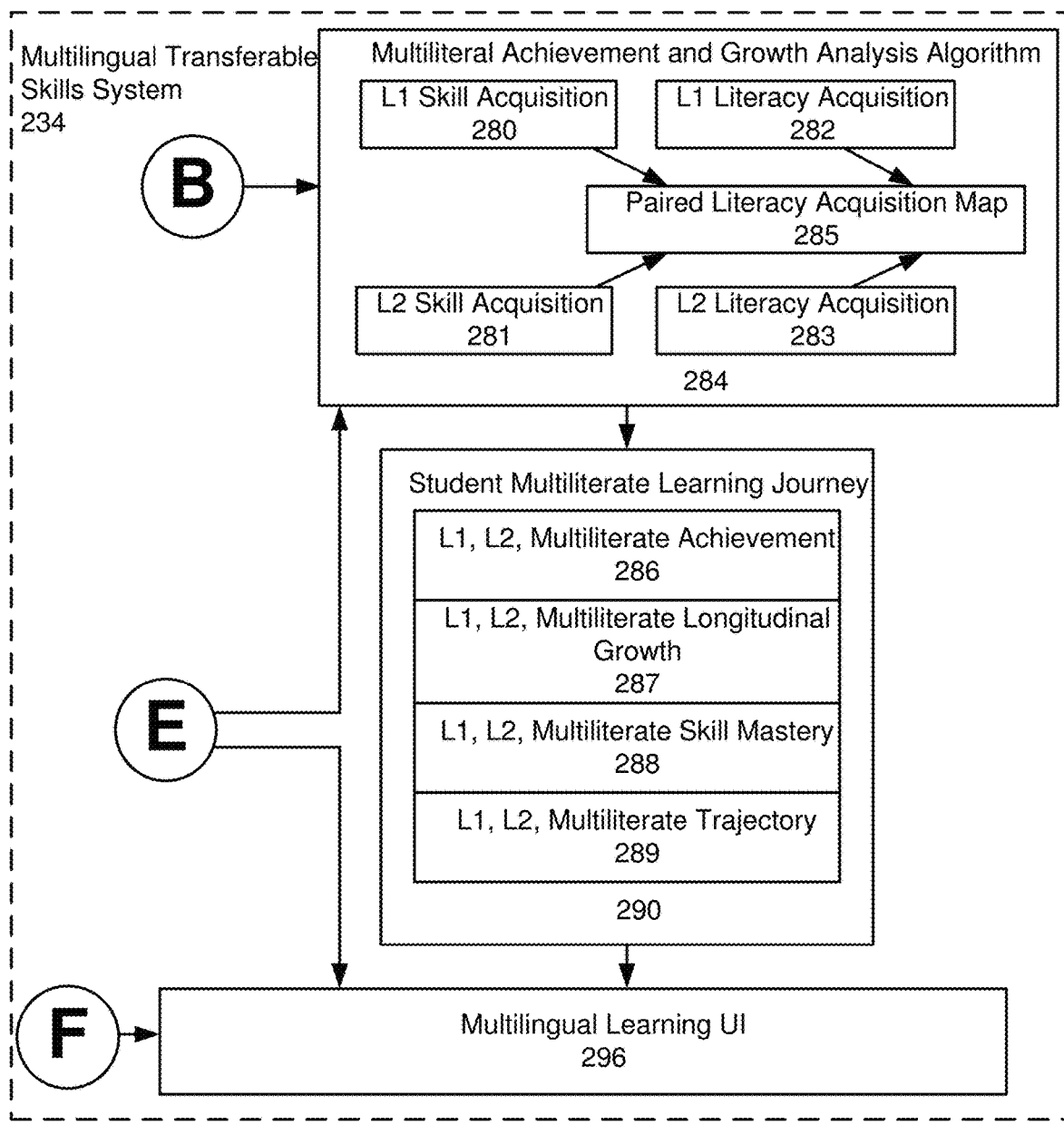
FIG. 2E is a block diagram illustrating components within the multilingual transferable skills system in accordance with the present invention.
Figure 2F:
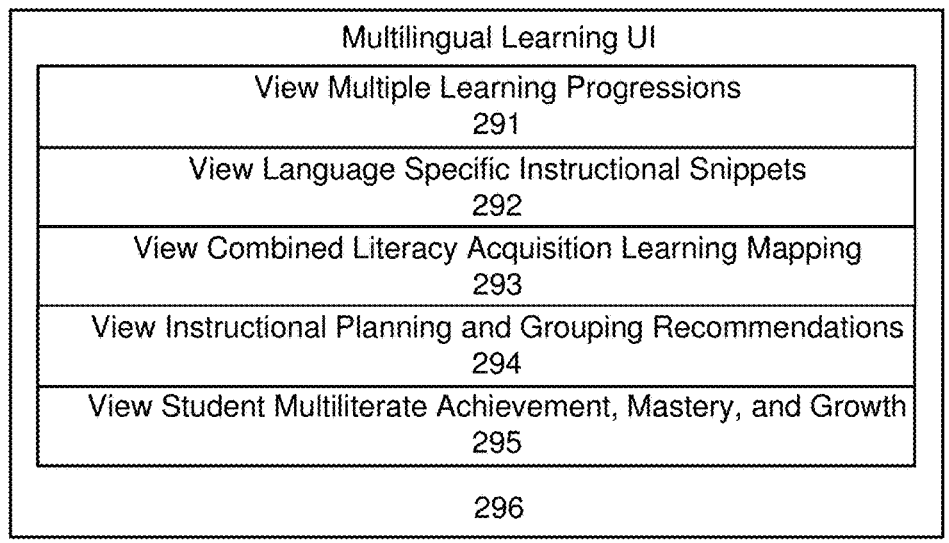
FIG. 2F is a block diagram illustrating the multilingual learning user interface including components within it in accordance with the present invention.

Referring now to FIG. 2E, the "Multiliterate Achievement and Growth Analysis Algorithm" in module 284 comprises a "L1 Skill Acquisition" module 280 and a "L1 Literacy Acquisition" module 282 and a "L2 Skill Acquisition" module 281 and a "L2 Literacy Acquisition" Module 283. Data from these modules or engines are provided to a "Paired Literacy Acquisition Map" Module 285.

Output from the "Multiliterate Achievement and Growth Analysis Algorithm" module 284 feeds into the "Student Multiliterate Learning Journey" in module 290, which has the "L1, L2 Multiliterate Achievement" in module 286, the "L1, L2 Multiliterate Longitudinal Growth" in module 287, the "L1, L2 Multiliterate Skill Mastery" in module 288, and the "Multiliteracy Trajectory" in module 289. Output from these modules or engines feed into the "Multilingual Learning UI" 296, which comprises a view to "Multiple Learning Progressions," in module 291, a view to "Language Specific Instruction Supports," in module 292, a view to "Combined Literacy Acquisition Learning Mapping," in module 293, a view to "Instructional Planning and Grouping Recommendations," in module 294, and a view to "Student Multiliterate Achievement, Mastery, and Growth" In module 296. The multilingual learning user interface (UI) is in the multilingual transferable skills system 234.

In FIG. 3, in some implementations, the automated multilingual toggle system ("S") 118 includes a Multilingual Learning User Interface 119, a Language Content Receiver or Identifier 121, a Learning Progression Engine 120, an Authentic Language 1 Learning Progression Engine 122, an Authentic Language N Learning Progression Engine 124, a Multiliterate Learning Journey 126, a Combined Literacy Acquisition Map 128, and an Algorithms Execution Engine 130, and a Course Mapping Engine 132. Each engine includes software and executable code configured to perform and execute the functionalities.

The automated multi-lingual toggle system 118 may collect and store mapping information (i.e., knowledge graphs) in the content data store 115, which maps how all content from the language sources 111a-111n are associated based on data from the jurisdiction-data server 117, which may provide information on different educational standards by region or administration. The electronic content (in different languages) in some instances may be associated by school, school district, subject matter taught, etc. The automated multi-lingual toggle system 118 may also generate and maintain a linking data in the content data store 115 or the language sources. In some embodiments, access to the automated multi-lingual toggle system 118 via the network 102 may be provided to teachers and administrators in an academic environment or other educational setting, such as a school district.

An electronic resource (in a particular language) may be any electronic media for conveying information. For example, an electronic resource can be instructional in nature, and can convey knowledge, information, and resources to a user who interacts with or views it. As a further example, an electronic resource may include an instructional audio or video segment, a publication, an interactive instructional reference, a lesson plan, a planning tool, a community forum, a sharing tool, an industry standard, a portfolio tool, a progress monitoring tool, a reporting tool, etc. In some embodiments, an electronic resource can include any of textural data, graphical data, video data, audio data, etc. For example, the electronic resource may be a webpage including one or more of text, graphics, video, audio, etc. In another example, the electronic resource may be or include a downloadable or streamable media object, including, for example, an electronic document (e.g., portable document format (PDF) document), electronic book (e-book), digital video, digital audio file, vector graphics file, etc. In these or other examples, the electronic resource may include a dataset/electronic file with text, graphics, video, audio, etc. embedded therein.

In some embodiments, these electronic resources may convey information on various topics, such as student training, teaching skills, and similar subjects of consequence and importance to the growth and development of the users. For instance, for teachers an electronic resource may be an instructional video about an aspect of teaching, and a teacher may view the video by streaming it using his/her user device 106. In another example, the electronic resource may be a web-based interactive reference including text, audio, video, etc., and the teacher may study the reference by interacting with it via a client application 106 such as a web browser before determining that it is appropriate for a particular student, student group or a particular lesson plan.

The multi-lingual toggle system 118, global in scope, may be tailored by institution, educational intent, jurisdictional standards or the like. For the purposes of this disclosure, it should be recognized that education has many standards and preferences that must be met in a particular country, state, or district. For example, the common core state standards initiative in the U.S. is an educational initiative that details what K-12 students should know in English language arts and mathematics at the end of each grade. This initiative seeks to establish consistent educational standards across the states as well as ensure that students graduating from high school are prepared to enter credit-bearing courses at two or four-year college programs to enter the workforce. It should be recognized that the fifty states in the U.S. may have unique needs and standards for education. It should also be recognized that education standards, objectives, or goals vary across countries and also regions within countries, and continents. Different standards may be based on states or districts, or alternatively, provenance, agency, department, dioecy, federal etc. There also exist international educational frameworks and organizations. For example, the International Standard Classification of Education (ISCED) is a statistical framework for organizing information on education maintained by the United Nations Educational, Scientific and Cultural Organization (UNESCO). There are efforts underway to globalize educational standards. As another example, the European Education Area fosters collaboration among the European Union Member States to build more resilient and inclusive national education and training systems. Standardizing global educational organizations and practices via management systems help manage processes and activities to meet global objectives and goals. There are standardized curricula, learning, and tests that are used across the world. The standards and frameworks may require a varying range of skills. As an example, in the United States, national U.S. agencies may include the "Wisconsin Department of Public Instruction," "Kansas State Department of Education," "New York Department of Education," and so on.

The language sources, either directly or via the content data store 115, may access the electronic resources stored therein. In some embodiments, the content data store (storage) 310 (FIG. 3) may collect information about the electronic resources (in different languages) from external sources or provide links to external sources. For instance, in some instances, the content data store 115 may aggregate attributes of the electronic resources (language specific), such as the author, publisher, file size, creation date, publication date, a thumbnail of the resource, etc., and store them in a resource library database (e.g., in memory 304 in FIG. 3). In various embodiments, the content data store 115 may access the language sources 111a-111n to transmit or stream copies of those resources to the user devices 106a-n of the users 114a-n requesting to interact with them.

The language sources are capable of receiving requests for electronic language-specific resources from user devices 106a-n and fulfilling those requests by transmitting the language-specific resources to the corresponding user devices 106a-n of the users 114a-n. In one example, upon logging into or accessing (or otherwise connecting to) the multi-lingual toggle system 118, a user device 106a may be presented with an interface by the user application 108a that may provide language-specific electronic resources (e.g., video, audio, text, etc.) for viewing. When users consume or interact with particular language-specific electronic resources from the language sources 111a-111n, the content may be stored in the content data store 115 in association with those users. In some instances, only the language-specific electronic content may be stored.

In some embodiments, the user application 108a may monitor user interactions with the language-specific electronic resources. For example, when a particular user interacts with a user interface generated and displayed by the user application 108a, the user application 108a may record interaction data via the network 102. In a further example, if a user interacts with a media player embedded in a user interface of the user application 108a, interaction data describing the user's interactions, such which actions the user took (e.g., clicked a pause button, a play button, a scrubbing dial, volume dial; maximized the viewing field of the media player; added a comment about the video using an associated interface element; etc.) may also be stored by the user application 108a or otherwise used.

In some embodiments, the client application 108a may generate and use presentational information to form the look and feel of the user interfaces (multiliterate learning user interfaces). For example, the electronic file(s) or data stream (s) may be formatted using a markup language (e.g., HTML, XML, etc.), style sheets (e.g., CSS, XSL, etc.), graphics, and/or scripts (e.g., JavaScript, ActionScript, etc.), and the client application 108a may interpret the interface instructions and render an interactive Web User Interface (WUI) for display on a user device 106a based thereon. In other implementations, the user application 108a may determine the formatting and look and feel of the user interfaces independently. Using the user interfaces presented by the client application 108a, the human user can input commands selecting various actions.

In some embodiments, the multiliterate user-interface 119 (FIGS. 1 and 3), in cooperation with an observation engine ("Observation 334" in FIG. 3), may generate a dashboard/interface (multiliterate learning user interface) to provide viewing selections (as illustrated by an example in FIG. 9, described in greater detail below).

The learning progression engine 120, the language-content receiver/identifier 121, the authentic language 1 learning progression engine 122, the authentic language N learning progression engine 124, the student multiliterate learning journey 126, the combined literacy acquisition map 128, the algorithms engine 130, and the course mapping engine 132 are software modules and engines of the multilingual toggle system 119. The functions of each are described in greater detail below.

FIG. 3 illustrates the various components coupled by a bus 306 to a communication unit 308, a processor 302, a memory 304, the data store 310 (115 in FIG. 1) providing data for a multiliterate learning journey for a student, by providing different views, which may be displayed on display unit by a graphics adaptor. The multilingual toggle system 118 is illustrated with the same components as in FIG. 1, however with different reference numerals. The multilingual toggle system as illustrated in FIG. 3 includes the multilingual learning user interface 119, the language content identifier 121, the learning progression engine 120, the authentic language 1 learning progression engine 122, and authentic language N learning progression engine 124, the multiliterate learning journey 126, the combined literacy acquisition map 128, the algorithms execution engine 130, and the course mapping engine 132

The processor 302 processes data signals and program instructions received from the memory 304 and data storage (e.g., at other remote locations). The processor 302 may comprise an arithmetic logic unit, a microprocessor, a general or special purpose controller or some other array of processors configured to perform computations and provide electronic display signals to create the different views displayable in different languages via a display device (e.g., on a user device 106a). The different views as illustrated include learning progressions as provided by the learning progression engine 120, authentic language 1 learning progression engine 122, authentic language N learning progression engine 124, multiliterate learning journey 126 the combined literacy acquisition map 128, the algorithms execution engine 130, and the course mapping engine 132.

The processor 302 is coupled to the bus 306 for communication with the other components. The processor 302 may comprise various computing architectures including a complex instruction set computer (CISC) architecture, a reduced instruction set computer (RISC) architecture, or an architecture implementing a combination of instruction sets. The processor 302 may be physical and/or virtual, and may include a single processing unit or a plurality of processing units and/or cores. In some implementations, the processor 302 may be capable of generating and providing electronic display signals to a display device, supporting the display of images, capturing and transmitting images, and performing complex tasks including various types of feature extraction and sampling. In some implementations, the processor 302 may be coupled to the memory 304 via a bus to access data and instructions therefrom and store data therein. The bus may couple the processor 302 to the other components of the computing device including, for example, the memory 304, the communication unit 308 (coupled via signal line 116 to other units), the display device 326 (with graphic adaptor not shown), and the input/output device(s) 324. Although only a single processor is shown in FIG. 3, multiple processors may be included. It will be obvious to one skilled in the art that other processors, operating systems, sensors, displays, and physical configurations than those that are illustrated may be used to perform the operations described in this specification.

The memory 304 may be a non-transitory storage medium. The memory 304 stores the instructions and/or data for operating multi-lingual toggle system 118, which may be executed by the processor 302. In one implementation, the instructions and/or data stored in the memory 304 comprises code for performing any and/or all of the techniques or functionalities that are described in this specification. The memory 304 may be a dynamic random-access memory (DRAM) device, a static random-access memory (SRAM) device, flash memory or some other memory device known in the art.

The data store or storage 310 (e.g., content data store 115) stores the data and program instructions that may be executed by the processor 302. In one implementation, the data storage may store the data of various types of users in the web forum. The data storage may include a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art. The data store 310 in some implementations includes various modules and engines, including but not limited to, a module storing student profiles 312, training dataset(s) 316, machine learning (ML) models 320, a combined literacy acquisition map 314, jurisdiction data 318, and objectives data 322. Each of these modules or engines is software or logic used to compile the data The communication unit 308 facilitates the communication (on line 104a-n) between the user device 106a-n (in FIG. 1) and the multi-lingual toggle system 118 over the network 102 (in FIG. 1). For example, a user 114a, via the user device 106a, may access the multi-lingual toggle system 118 to view or read language-specific electronic content and otherwise interact with the multi-lingual toggle 118 and receive information from the multi-lingual toggle system 118, via the communication unit 308. The communication unit 308 also displays the content or information either received from or hosted via the multi-lingual toggle system 118 to any of the users 114a through 114n.

The communication unit 308 couples to the multi-lingual toggle system 118 via the network 102 by the signal line 116 (in FIG. 1) and via the bus 306. The communication unit 308 may include network interface modules, which include ports for wired connectivity such as but not limited to USB, SD, or CAT-5, etc. The network interface modules are configured to link the processor 302 to the network 102 that may in turn be coupled to other processing systems. The network 102 (FIG. 1) may comprise a local area network (LAN), a wide area network (WAN) (e.g., the Internet), and/or any other interconnected data path across which multiple devices may communicate. The network interface modules are configured to provide conventional connections to the network 102 using standard network protocols such as TCP/IP, HTTP, HTTPS and SMTP as well as any others that are understood to those skilled in the art. The network interface modules include a transceiver for sending and receiving signals using WIFI, Bluetooth® or cellular communications for wireless communication. Each of the platforms, modules, and/or engines described above may include software or program instructions configured to perform the functionalities described here.

The bus 306 as illustrated in the drawings may represent one or more buses including an industry standard architecture (ISA) bus, a peripheral component interconnect (PCI) bus, a universal serial bus (USB), or some other bus providing similar functionality. The bus may include a communication bus for transferring data between components of the computing device or between computing device and other components of the system 100 via the network. 102 or portions thereof, a processor mesh, a combination thereof, etc. In some implementations, the application 10S and server 118 and various other software operating on the computing devices (e.g., an operating system, device drivers, etc.) may cooperate and communicate via a software communication mechanism implemented in association with the bus. The software communication mechanism may include and/or facilitate, for example, inter-process communication, local function or procedure calls, remote procedure calls, an object broker (e.g., CORBA), direct socket communication (e.g., TCP/IP sockets) among software modules. UDP broadcasts and receipts, HTTP connections, etc. Further, any or all of the communication may be configured to be secure (e.g., SSH, HTTPS, etc.).

The illustrated multi-lingual toggle system 118 depicted in FIG. 3 (and 1-2) is provided by way of example and it should be understood that it may take other forms and include additional or fewer components without departing from the scope of the present disclosure. For example, in some implementations, the multi-lingual toggle system 118 may include an input device and output devices not shown separately but part of the communication unit 308 (e.g., a computer display, a keyboard and mouse, etc.). Additionally, it should be understood that the computer architecture depicted in FIG. 3 is applicable to the other entities of the system, such as the content data store 115 (in FIG. 1) and/or the jurisdiction-data server 117 (in FIG. 1) with various modifications.

The processor 302 includes an arithmetic logic unit, a microprocessor, a general-purpose controller, or some other processor array to perform computations and provide electronic display signals to a display device (not shown). The processor 302 may be coupled to the bus 306 for communication with the other components of the multi-lingual toggle system 118. The processor 302 may process data signals and may have various computing architectures including a complex instruction set computer (CISC) architecture, a reduced instruction set computer (RISC) architecture, or an architecture implementing a combination of instruction sets. Although only a single processor 302 is shown in FIG. 3, multiple processors may be included. The processor 302 may be capable of supporting the display of images and the capture and transmission of images, performance of complex tasks, including various types of feature extraction and sampling, etc. It should be understood that the multi-lingual toggle system 118 could include various operating systems, sensors, displays, additional processors, and other physical configurations.

The memory 304 stores instructions and/or data that may be executed by the processor 302. The memory 304 is coupled to the bus 306 for communication with the processor 302 and the other components of the multi-lingual toggle system 118. The instructions and/or data may comprise code for performing any and/or all of the techniques described herein. In particular, the memory 304 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 302. A non-transitory computer-usable storage medium may include any and/or all computer-usable storage media. In some implementations, the memory 304 may include volatile memory, non-volatile memory, or both. For example, the memory 304 may include a dynamic random-access memory (DRAM) device, a static random-access memory (SRAM) device, flash memory, a hard disk drive, a floppy disk drive, a CD ROM device, a DVD ROM device, a DVD RAM device, a DVD RW device, a Blue-Ray™ storage device, a flash memory device, or any other mass storage device known for storing information on a more permanent basis. It should be understood that the memory 304 may be a single device or may include multiple types of devices and configurations.

Figure 4:
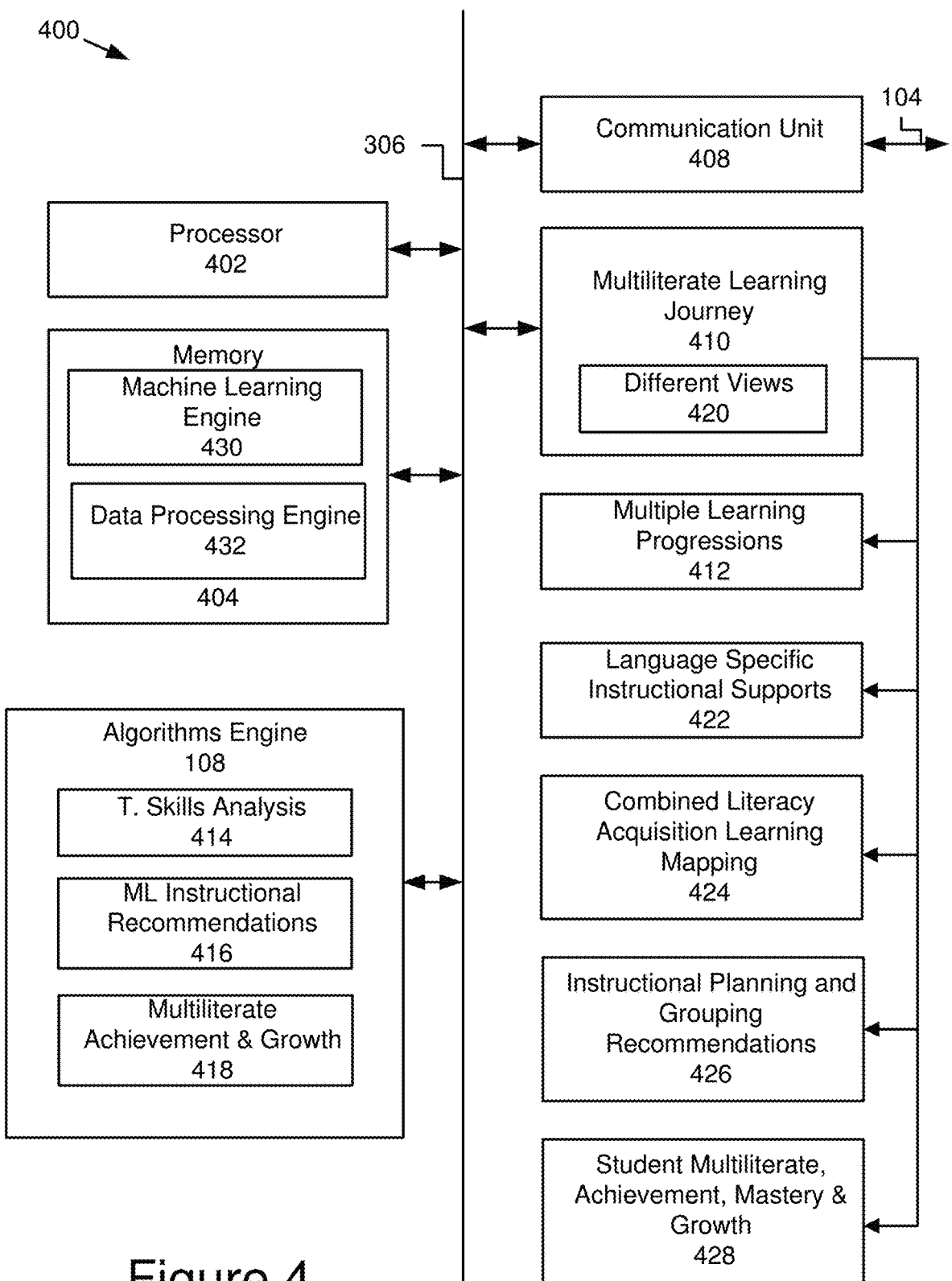
FIG. 4 is a block diagram illustrating an example configuration of the algorithm engine and its various components.

Referring now to FIG. 4, in some embodiments, the memory 404 (expanded version of memory 304 in FIG. 3) in some implementations comprises a machine learning engine 430 or other artificial intelligence configured to gather data, aggregate data into datasets, make determinations, perform comparative functions, correlate data, generate scores and the like. The datasets that are created are used to create, build, and/or update the language knowledge graph 258 (FIG. 2C) and the language learning progression models 242 and 250 illustrated in FIG. 2B. The machine learning engine 430 is coupled to a data processing engine 432 to compile datasets and train the language knowledge graph 258 and learning progression models 242 and 250 in the application 118 with the various datasets that are compiled and used to process data inputs in real time. In some instances, the data may be generated by giving different weight factors to each of the types of data gathered. These weight factors may be determined by machine learning or other artificial intelligence and may be updated over time as the models change and adapt based on the data collected. The data processing engine 432 processes, correlates, integrates, and synchronizes the received data streams from disparate devices and data sources 111 into a consolidated data stream as described herein. In some implementations, the data processing engine 432 instantiates a data ingestion layer that transports data from the assorted data sources (including the E-content data sources) to the data storage, where it can be sorted, accessed, analyzed by the application and server 118. For example, the data ingestion layer processes incoming data, prioritizes sources, validates individual files, and routes the data to the data storage. In some implementations, the data processing engine 432 instantiates a data transformation layer that maps and converts data from a source format (e.g., of a E-content source) to a destination format. For example, the data transformation layer transforms non-XML data to XML data. The data processing engine 432 creates a user profile for a student user based on processing the received data streams. In some implementations, the data processing engine 432 may update a user profile that is already in the system. The user profile may include data and insights about the user including name, unique user identifier, age, gender, location, profile photo, user preferences, education goals, skill levels, activities etc.). The data processing engine 432 stores and updates the user profiles in the data storage.

In some implementations, the data processing engine 432 curates one or more training datasets based on the data streams received in association the user devices 106, in accordance with algorithms executed by server 118. The machine learning engine 430 described below uses the training datasets to train the machine learning models for performing various functionality as described herein. Example training datasets curated by the data processing engine 432 may include, but not limited to, a dataset on student skills, assessment trends, multilingual capabilities etc. Alternatively, datasets may include, data specific to jurisdictions. In some implementations, the aggregated data may be reviewed, segments identified and labeled, and stored in the data storage. The machine learning engine 430 may include software and/or logic to provide functionality for training one or more machine learning models or classifiers using the training datasets created or aggregated by the data processing engine 432. The machine learning engine 430 is adapted to receive input from data scientists, analysts, or engineering staff to define and enhance the machine learning models. The machine learning engine 430 may also provide portals through which users can provide refinements and improvements to the models or introduce new models. In some implementations, the machine learning engine 430 receives and/or generates data, models, training data, and scoring parameters necessary to create the machine learning models.

For example, the machine learning engine 430 may provide curated data inputs, provide label identification hints and patterns, provide model negators, perform training, testing, approval and publish model versions, perform scoring model parameter tuning, or create scoring accuracy thresholds.

In some implementations, the machine learning engine 430 may be configured to incrementally adapt and train the one or more machine learning models every threshold period of time. For example, the machine learning engine 430 may incrementally train the machine learning models every hour, every day, every week, every month, etc. based on the aggregated dataset. In some implementations, a machine learning model is a neural network model and includes a layer and/or layers of memory units where memory units each have corresponding weights. A variety of neural network models may be utilized including feed forward neural networks, convolutional neural networks, recurrent neural networks, radial basis functions, other neural network models, as well as combinations of several neural networks. Additionally, or alternatively, the machine learning model may represent a variety of other machine learning techniques in addition to neural networks, for example, support vector machines, decision trees, Bayesian networks, random decision forests, k-nearest neighbors, linear regression, least squares, hidden Markov models, other machine learning techniques, and/or combinations of machine learning techniques. In some implementations, the machine learning engine 430 may train one or more machine learning models to perform a single machine learning task or a variety of machine learning tasks. In other implementations, the machine learning model may be trained to perform multiple tasks.

The machine learning engine 430 determines a plurality of training instances or samples from the labelled dataset curated by the data processing engine 432. The machine learning engine 430 may apply a training instance as input to a machine learning model. In some implementations, the machine learning engine 430 may train the machine learning model using any one of at least one of supervised learning (e.g., support vector machines, neural networks, logistic regression, linear regression, stacking, gradient boosting, etc.), unsupervised learning (e.g., clustering, neural networks, singular value decomposition, principal component analysis, etc.), or semi-supervised learning (e.g., generative models, transductive support vector machines, etc.). Additionally, or alternatively, machine learning models in accordance with some implementations may be deep learning networks including recurrent neural networks, convolutional neural networks (CNN), networks that are a combination of multiple networks, etc. The machine learning engine 430 may generate a predicted machine learning model output by applying training input to the machine learning model. Additionally, or alternatively, the machine learning engine 430 may compare the predicted machine learning model output with a known labelled output from the training instance and, using the comparison, update one or more weights in the machine learning model. In some implementations, the machine learning engine 430 may update the one or more weights by backpropagating the difference over the entire machine learning model.

In some implementations, the machine learning engine 430 may test a trained machine learning model and update it accordingly. The machine learning engine 430 may partition the labelled dataset obtained from the data processing engine 432 into a testing dataset and a training dataset. The machine learning engine 430 may apply a testing instance from the training dataset as input to the trained machine learning model. A predicted output generated by applying a testing instance to the trained machine learning model may be compared with a known output for the testing instance to update an accuracy value (e.g., an accuracy percentage) for the machine learning model. Once a model is trained and tested, the model is then published and made available for turning predictions. In some implementations, the model may be versioned and serviced through an internal HTTP endpoint to be used by other component(s) of the application 118. In some implementations, model training, testing and publishing will be iterative, and adapted automatically. New versions will be published based on improvements based on training of historical data and efficiency calculations as more data is collected over a period of time.

Referring to FIG. 3, the communication unit 308 is an interface for sending to and receiving data from other computing devices. In the illustrated embodiment, the communication unit 308 is coupled to the network 102 by the signal line 116 and coupled to the bus 306. In some embodiments, the communication unit 308 may include a network interface device (I/F) having ports for wired connectivity. For example, the communication unit 308 may include a CAT-5/6/7 interface, USB interface, or SD interface, etc. The communication unit 308 may also include a transceiver for sending and receiving signals using Wi-Fi, Bluetooth® or cellular communications for wireless communication. The communication unit 308 can link the processor 302 to the network 102 that may in turn be coupled to other processing systems. The communication unit 308 may provide connections to the network 102 and to other entities of the system 100 using standard communication protocols including, for example, TCP/IP, HTTP, HTTPS, etc.

The observation engine 334 provided in the multilingual learning user interface 119 is software including routines for facilitating outputs received from the other engines of the multilingual toggle system 119. In particular, the observation engine 334 may send, receive and store language-specific data for observation, templates and files including questions and answers tied to performance standards (e.g., standards related to execution, compliance, effectiveness, personalized user plans, etc.), identify and suggest language-specific electronic learning resources based on observations, to generate related reports.

In the illustrated embodiment, the observation engine 334 cooperates with other engines and is coupled for communication with the other components of the multilingual toggle system 118. The observation engine 334 is also coupled to the network 102 via the communication unit 308 for communication with the other entities of the system.

In some embodiments, the multilingual learning user interface 119, the observation engine 334 may be sets of instructions executable by the processor 302 to provide their respective functionality. In other embodiments, these components are stored in the memory 304 and are accessible and executable by the processor 308 to provide their respective functionality. In any of these embodiments, these components may be adapted for cooperation and communication with the processor 302 and other components of the multi-lingual toggle system 118.

The observation engine 334 is software including routines for sending, receiving, processing, and storing observation-related data. In some embodiments, the observation engine 334 may provide observation templates to viewers for use in observing and assessing language-specific content.

The content of the language-specific observation templates may be displayed to users via user interfaces generated (e.g., see FIG. 9) and displayed by the user application 108. The user interfaces displaying the language-specific content of an observation template to a viewer may also provide functionality for completing the various fields within the template. For example, while observing a target subject in the field, a viewer may interact with interface elements presented by the user application 108 to input information about the language-specific electronic content.

In some embodiments, an observation template of the observation engine 334 may include predefined questions and answers for assessing the language-specific electronic content against various predetermined requirements. For example, the requirements may be based on institutional policy, compliance with requirements, legislated practices, or industry standards, and the questions may be directed to whether or not the electronic content meets those requirements/standards. In these embodiments, the same template may be used repeatedly by an user to record his/her observations of electronic content. In other embodiments, various different templates may be used for the observational assessments of an electronic content.

The language-specific electronic resources may be distributed among several data stores (e.g., several versions of the data store 115) located across the network or cloud platform 102 or may be stored in a single content data store 115. In the illustrated embodiment, the language source and the content data store 115 cooperate to store the language-specific electronic resources. In any of the foregoing embodiments, the resources stored in the data store may be cataloged.

The communication unit 308 may have a display device, which may be any device equipped to present output signals generated and provided by the user device 106. In some embodiments, the display device may be configured to display electronic images and data including, for example, multilingual learning user interfaces and formatted information. For example, the display device may be any conventional display device, monitor or screen, such as an organic light-emitting diode (OLED) display, a liquid crystal display (LCD), an e-ink display, etc. In some embodiments, the display device may be a touch-screen display capable of receiving input from one or more fingers of a user 114a. For example, the display device may be a capacitive touch-screen display capable of detecting and interpreting multiple points of contact with the display surface. In some embodiments, the display device may be coupled to the bus 306 via the graphics adapter (shown within the display device/communication unit 308, but also may be configured outside), which generates and provides display signals to the display device. The graphics adapter may be a separate processing device including a separate processor and memory (not shown) or may be integrated with the processor 302 and memory 304.

The input device provided coupled to the communication unit 308 as illustrated represents any device for inputting data to the user device 106. In some embodiments, the input device may be a touch-screen display capable of receiving input from the one or more fingers of a user 114. The functionality of the input device 324 and the display device 326 may be integrated, and a user 114 of the device 106 may interact with the device 106 by contacting a surface of the display device 326 using one or more fingers. For example, the user 114a-n may interact with an emulated (i.e., virtual or soft) keyboard displayed on the touch-screen display by using fingers to contact the display device 326 in the keyboard regions. In other embodiments, the input device 324 is a separate peripheral device or combination of devices. For example, the input device 324 may include a keyboard (e.g., a QWERTY keyboard) and a pointing device (e.g., a mouse or touchpad). The input device 324 may also include a microphone (e.g., for voice input) or other known peripheral devices.

Referring to FIGS. 1 and 3, the user application 108 is software including routines for sending and receiving data to the other entities of the system, including, for example, the multi-lingual toggle system 118, the content data store 115, and the jurisdiction-data server 117. In some embodiments, the user application 108a is a web browser application for accessing the resources provided by the multi-lingual toggle system 118. For example, the multi-lingual toggle system 118 operated in cooperation with the content data store 115 may be a web-based service and the user application 108 may access various electronic resources provided by the service via uniform resource locators (URLs). In other embodiments, the user application 108a is an application customized specifically for accessing the multi-lingual toggle system 118, and more particularly, for cooperating and interacting with the observation engine 334.

In the illustrated embodiment, the user application 108 provides a user 114a-n (e.g., a student or teacher) interacting with the device 106 mechanisms for inputting viewing, adding, modifying, deleting selections-related data related to the electronic content.

In the illustrated embodiment, the user application 108 integrating the multilingual toggle system 118 to users may include other user-interface module than the one illustrated here (multilingual learning user interface 119). While not shown, in some embodiments, the user application 108 may include an authentication or verification module for authenticating the user 114a-n to access the multi-lingual toggle system 118.

In some embodiments, the user application 108, the multilingual learning user interface 119, and the other components illustrated, are sets of instructions executable by the processor 302 to provide their respective functionality. In other embodiments, the user application 108, the multilingual learning user interface 119, the observation engine 334, and/or either parts of or wholly, the other components and engines may be stored in the memory 304 of the user device 106 and are accessible and executable by the processor 302 to provide their functionalities. It should be recognized that the Observation engine 334 may send interface signals to the multilingual toggle system 118, and responsive to receiving these signals, the multilingual learning user interface 119 may generate and display user interfaces that correspond to the instructions carried by the interface signals. In another example, the multilingual learning user interface 119 may receive input signals via the input device and send those signals to the observation engine for processing. In some embodiments, the multilingual learning user-interface 119, via the observation engine 334, may receive information and display the information to users, populate observation templates for user input, save selection files based on the observation templates, transmit selection-related data such as observation files to the observation unit or storage, receive language-specific selection-related statistics and reports and organize and display them to the user or others, receive electronic resources for consumption, etc.

The multilingual learning user interface 119 may be software including routines for rendering user interfaces and for receiving user input. The multilingual learning user interface may be coupled to the input device via the bus 306 to receive input signals from the user 114*a-n*. For example, an observer/user 114*a-n* can select an answer to a selection-related question using the input device, and the user-interface module receives signals describing the answer. The multilingual learning user interface 119 may store the input signals in the memory 304 for retrieval by the other elements of the client application 108.

The user interfaces generated by multilingual learning user interface 119 may include interfaces in different languages for inputting, modifying, and deleting information, displaying notifications, rendering video, displaying images and text, displaying vector-based content, sending and storing information, etc. In some embodiments, the user interfaces include user interface elements that allow users 114*a-n* to interact with the user device 106 and input information and commands, such as text entry fields, selection boxes, drop-down menus, buttons, virtual keyboards and numeric pads, etc.

Referring now to FIG. 4, the multilingual toggle system 118 (referenced in this figure by reference numeral 400) comprises the processor 402, the memory 404 (with machine learning engine 430 and data processing engine 432), and the algorithms engine 108, which further comprises components or modules referenced as T. Skills Analysis module or engine 414, ML Instructional Recommendations module or engine 416, and Multiliterate Achievement and Growth module or engine 418. Each of these is software and/or logic that performs the functions to conduct analyses, generate recommendations based on observations gleaned from tracking the various types of data described here, and assessing the multiliterate achievement and growth for each student. In addition, the multilingual toggle system 118 includes the communication unit 408 coupled to the other servers and the network via signal line 104 and the multiliterate learning journey module or engine 410, with a module that configures different views 420. The multiliterate learning journey module 410 is coupled to multiple learning progressions module or engine 412, language specific instructional supports module or engine 422, the combined literacy acquisition learning mapping module or engine 424, the instructional planning and grouping recommendations module or engine 426, and the student multiliterate, achievement, mastery and growth module or engine 428.

Figure 5:
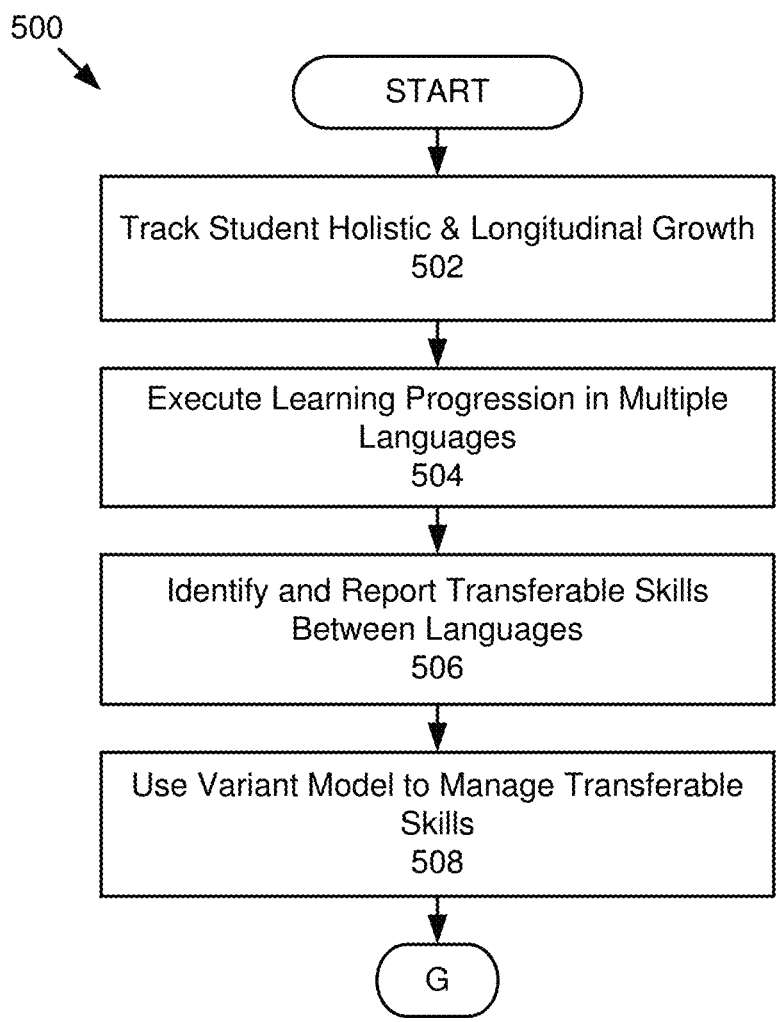
FIG. 5 is a flow chart illustrating an example overall method of the functionalities of the multi-lingual toggle system. The process in FIG. 5 connects to FIG. 6 via connector designator "G."

Referring now to FIG. 5, an example method 500 for automatically transferring multi-lingual skills and mapping courses across electronic content in different languages is described. The method 500 begins at block 502, including one or more operations, for tracking student holistic and longitudinal growth. The method 500 proceeds to the next block 504, including one or more operations for executing learning progression in multiple languages. The method 500 proceeds to the next block 506, including one or more operations for identifying and reporting transferring multi-lingual skills between languages. The method 500 proceeds to the next block 508, including one or more operations for using a variant model to manage transferable skills. The method 500 continues via connector "G" to further operations 600 in FIG. 6.

Figure 6:
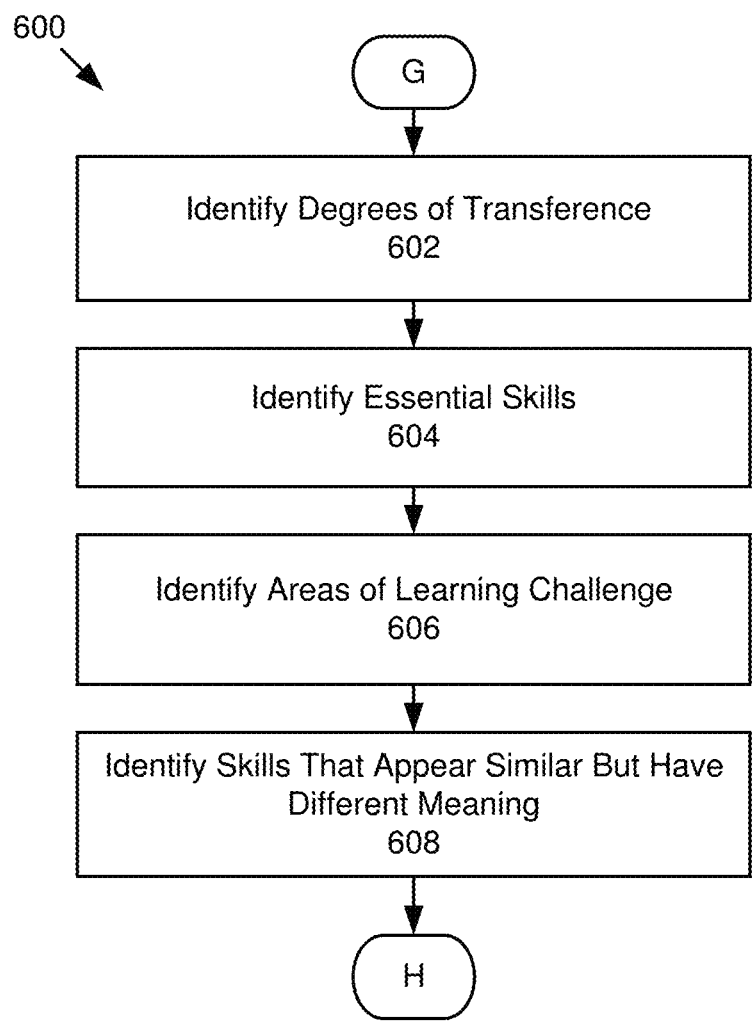
FIG. 6 is a continuing flow chart illustrating further operations of the multi-lingual toggle system in accordance with some embodiments of the present invention. The process in FIG. 6 connects to FIG. 7 via connector designator "H."

Referring now to FIG. 6, the method 600 proceeds to the next block 602, including one or more operations for identifying degrees of transference. The method 600 proceeds to the next block 604, including one or more operations for, identifying essential skills. The method 600 proceeds to the next block 606, including one or more operations for identifying areas of learning challenge. At this point, it may be evaluated if students are struggling. The method 600 proceeds to the next block 608 including one or more operations for identifying skills that appear similar but may have different meaning. Alternatively, the method 600, may proceed to the next block illustrated in FIG. 7, via connector "H."

Figure 7:
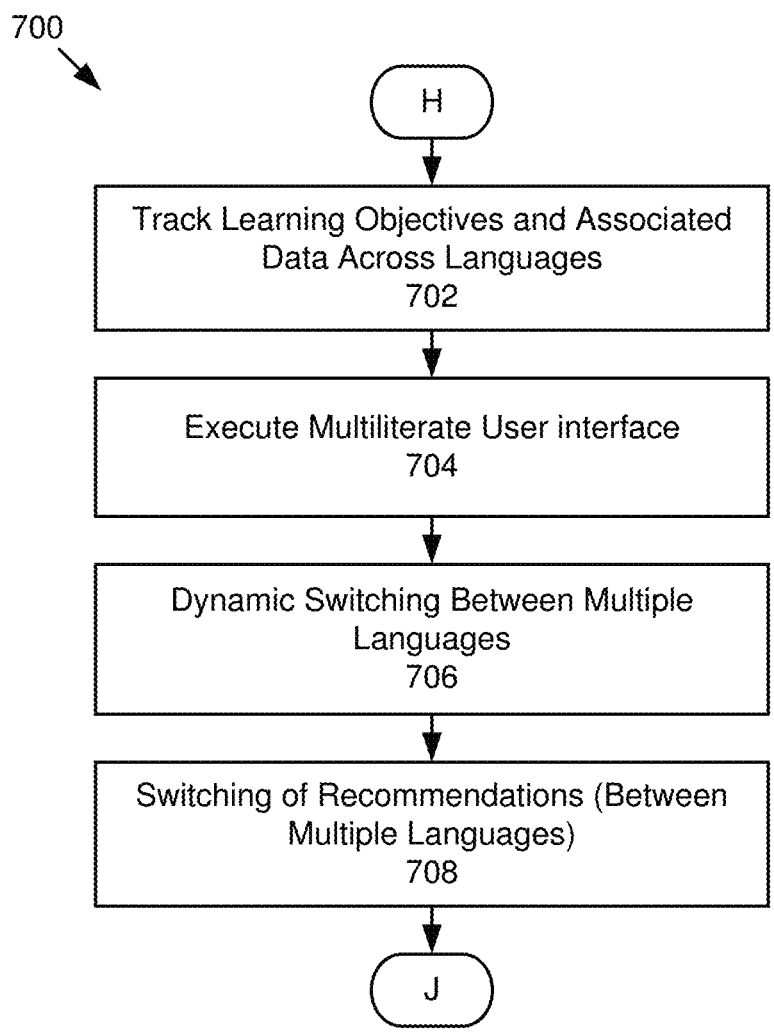
FIG. 7 is a continuing flow chart illustrating further operations of the multi-lingual toggle system in accordance with some embodiments of the present invention. The process in FIG. 7 connect to FIG. 8 via connector designator "I."

Referring now to FIG. 7, the next block of operations designated generally by reference numeral 700, proceeds to the next block 702, including one or more operations for tracking learning objectives and associated data across languages. The method 700 proceeds to the next block 704, including one or more operations for executing a multiliterate user interface. The method 700 proceeds to the next block 706, including one or more operations for performing dynamic switching between multiple languages. The method 700 proceeds to the next block 708, including one or more operations for, switching recommendations between different languages. The method 700 proceeds to the next block of operations illustrated in FIG. 8, via the connector "J."

Figure 8:
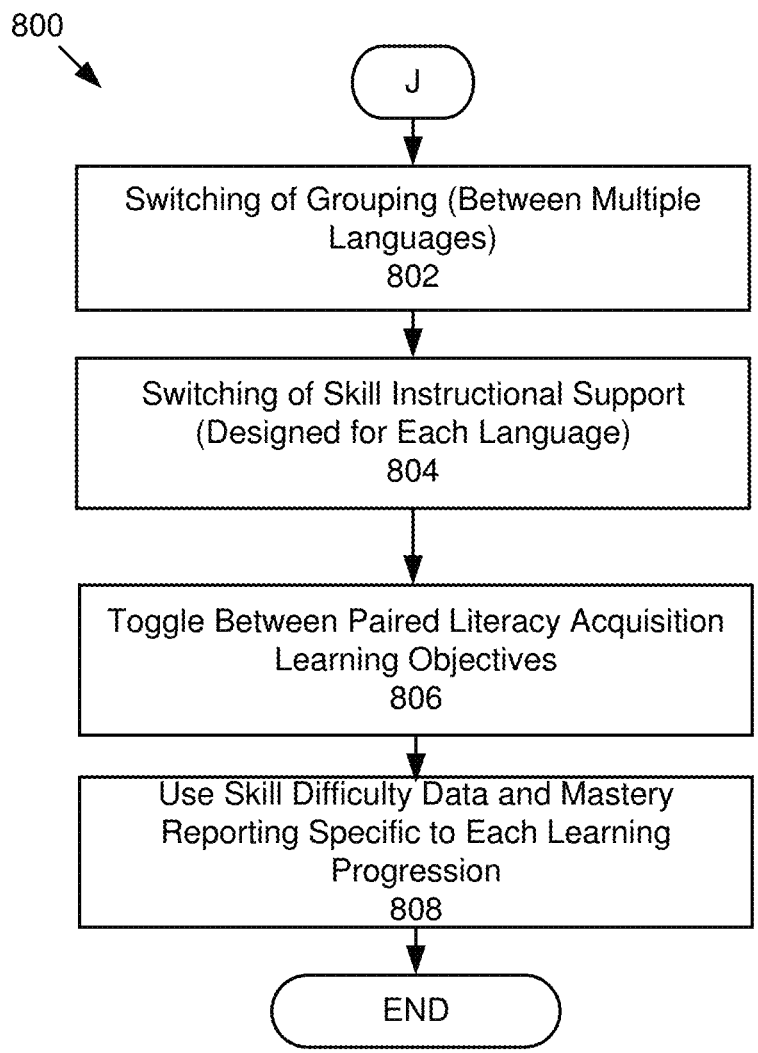
FIG. 8 is a continuing flow chart illustrating further operations of the multi-lingual toggle system in accordance with some embodiments of the present invention.

Referring now to FIG. 8, the method 800 proceeds to the next block 802, including one or more operations for switching grouping between multiple languages. The process 800 proceeds to the next block 806, including one or more operations for switching skill instructional support designed for each language. The process 800 proceeds to the next block 806, including one or more operations for toggling between paired literacy acquisition learning objectives. The method 800 proceeds to the next block 808, including one or more operations for, using skill difficulty data and mastery reporting specific to each learning progression. It will be recognized by those skilled in the art, that many products, whether for educational purpose or otherwise, may be correlated before being provided via a user interface for use.

It should be understood that the methods 500-800 are provided by way of example, and the variations and combinations of these methods, as well as other methods, are contemplated. For example, in some embodiments, at least a portion of the methods 500-800 represent various segments of one or more larger methods and may be concatenated or various steps of these methods may be combined to produce other methods which are encompassed by the present disclosure. Additionally, it should be understood that the operations of the multilingual toggle system 118 and reporting on the conclusions of this system, as described with reference to at least the methods 500-808, could be iterative, and thus repeated as many times as necessary to assist in transferring multi-lingual skills and mapping courses across language-specific electronic content before display to a target student, teacher, administrator, or any other person. It should be recognized that an example user interface (or dashboard display) may be generated and displayed by the user application 108 to allow users 114*a-n* to interact with the system 118 and to allow the system 100 to present information to the users. For example, various user interfaces may be produced, to display reports and statistics, display dialogs among the users (by a chat feature), set parameters and settings, send electronic communications, view, listen to and/or interact with the electronic resources provided by the multi-lingual toggle system 118, etc. The multiliterate learning user interface may include a menu region and an observation region. The menu region may include a listing of products representing a particular region or standard.

Variations to this multiliterate observational user interface are possible. An observational interface may be configured to display a dashboard and screenshots that may be specific to a particular subject or standard in a specific language. In some embodiments, hovering over a standards bar once a language-specific electronic resource is selected, displays the standard code and text. Changing the selection to standards view displays the state-specific standards code; hovering over the code displays the standard's text.

The observation region may include a header region and a body region. The header region includes fields for displaying the name of the user reviewing the selections is (e.g., Jim Brown) and which selection template is being used for observation, and for inputting the date and time the observation session was started and completed. The header region may also include an options dialogue box for configuring settings, such as generating and sending a report and updating a summary for a particular product. For example, the observer may check a checkbox to set an option for generating and sending a report and for updating a product summary for storage in the data store 115 for later access.

The body region includes elements for the observer to input his/her assessments made during the observation. There is a window (which may appear as a pop-up) for user activity indicating user objectives. The body region may also include a resource region for displaying one or more electronic resources or products. In some embodiments, the language-specific electronic resources or products displayed in the resource region are received from the language sources.

The resource region may include a resource scrolling region, a scrollbar, one or more electronic resources or products, a resource description region, a task button, a preview button, etc. The resource scrolling region provides the user with functionality to scroll through and select one or more of the various language-specific electronic resources displayed therein. The scrolling may be performed by interacting with the scrollbar or the resource scrolling region (e.g., swiping the resource scrolling region via a touch-sensitive display with an input element, such as a finger). The selecting can be performed by interacting with the representations of the language-specific electronic resources or products in the resource scrolling region.

In some embodiments, the language-specific resource region may initially be hidden from display until the user inputs observation data into one or more of the answer elements. In other embodiments, the resource region may always be displayed, or may be hidden or displayed by selecting a corresponding expansion/contraction button (not shown). Any number of assessment regions and resource regions may be populated displayed. For example, there could be numerous standards and associated questions/indicators for measuring the product, and thus numerous corresponding resource regions for displaying electronic resources that correspond to the various assessments that have been made by the user may be provided.

Figure 9:
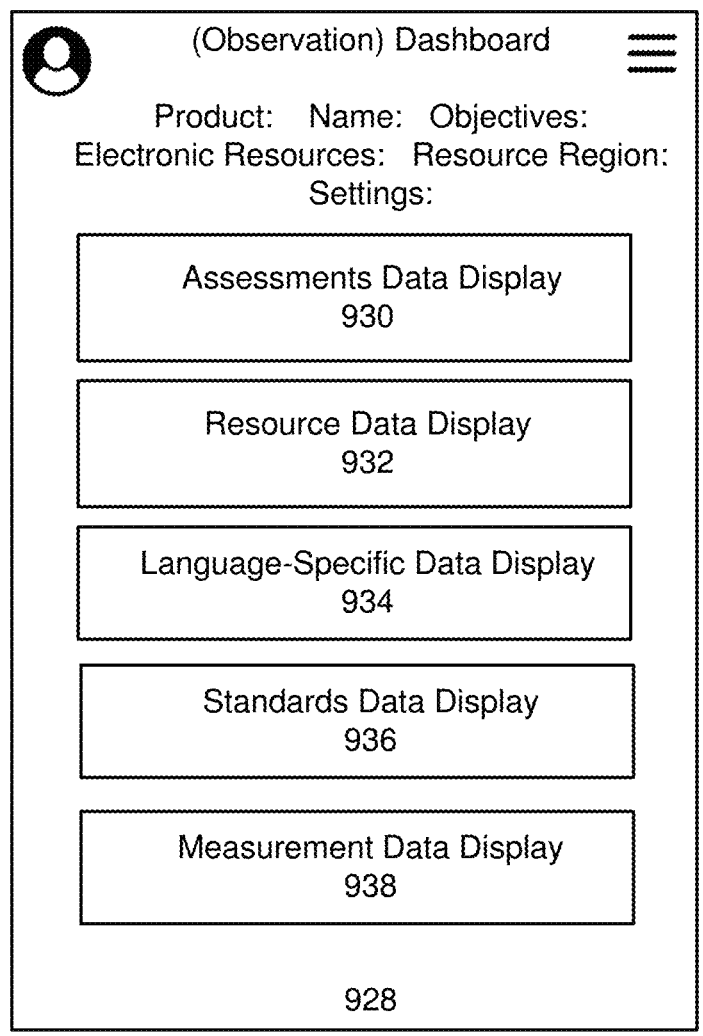
FIG. 9 is a graphical representation of a dashboard.

Referring now to FIG. 9, an example dashboard 928 is illustrated. This dashboard may be used for a student or other and adapted to display data and metrics as described herein. The multi-lingual toggle system generates the student dashboard for providing language-specific content to a student user. The student user experience associated with the dashboard for creating a multiliterate mindset includes convenient presentation of key indicators and status. In the illustrated embodiment, FIG. 9 shows an example graphical representation illustrating user interfaces for presenting a dashboard tracking various metrics. The user interfaces as illustrated may be presented on a mobile application running on a client device, such as a mobile computing device. Although the user interfaces are illustrated in separate blocks, they may be scrolled through in sequence on a display of the mobile computing device. The dashboard for content management is designed to provide the student user with timely access to tools, educational resources, and intervention programs. The dashboard for content management is personalized to the student viewing the dashboard. In FIG. 9, the user interface 928 shows a first portion 930 for student assessments display that are personalized to a particular student's situation. In FIG. 9, the user interface 928 shows a second portion 932 for resource data display designed for particular students. A third portion 934 is for displaying language-specific data display. In one example, one student might receive notifications of progress or reminders to undertake tasks toward developing a multilateral mindset, while another user may receive those notifications or reminders on another day, depending upon each student user's language-specific educational path. The notification or reminder may include a deep link that is selectable by the student user to view additional details, such as the links to additional materials or assessment dates etc. The notification may indicate to the student user to schedule an assessment date based on requirements met or outlined for the student user. In FIG. 9, the user interface 928 shows a fourth portion 936 detailing standards data display. In some embodiments, the standards may be associated with a particular student user's intervention program (e.g., specific program activities or tasks designed to accelerate learning). The user interface 928 shows a fifth portion 938 for displaying measurement data, for example, relating to student language skill mastery to illustrate the student's level of learning and mastery of particular language components.

An example system and methods for automatically transferring multi-lingual skills and mapping courses across language-specific electronic content and products is described. In the above description, for purposes of explanation, numerous specific details are set forth in order to provide a thorough understanding of the present disclosure. It should be understood that the technology described in the various example embodiments can be practiced without these specific details. In other instances, structures and devices are shown in block diagram form in order to avoid obscuring the description.

Reference in the present disclosure to "some embodiments," "an embodiment," "an example embodiment," "other embodiments," etc., means that a particular feature, structure, or characteristic described in connection with the embodiment is included in at least one embodiment of the description. The appearances of the phrase "in some embodiments" in various places in the present disclosure are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "ranking" or "identifying" or "determining" or "displaying" or "receiving" or "conducting" or "collecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium including, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present disclosure can take the form of an entirely hardware embodiment, an entirely software embodiment or an embodiment containing both hardware and software elements. In a preferred embodiment, the present disclosure is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, wireless adapters, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description. In addition, the present disclosure is not described with reference to any particular programming language. It will be appreciated that a variety of programming languages may be used to implement the teachings of the present disclosure as described herein.

It is intended that the scope of the disclosure should not be limited by this particular detailed description. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a stand-alone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   in a server, with one or more processors and a memory, using executable code stored in the memory to cause the one or more processors to execute control actions over a network to:
   track, using the one or more processors at the server, over the network, holistic and longitudinal growth patterns for a plurality of students in different educational jurisdictions;
   execute, using the one or more processors at the server, over the network, a plurality of learning progression programs in multiple languages for the plurality of students, wherein each learning progression program defines data representative of a learning objective, literacy acquisition, one or more essential concepts, literacy education, one or more learning challenges, one or more skills, and a level of skill difficulty;

identify, using the one or more processors at the server, over the network, one or more transferable skills between the multiple languages;

use a transferable skill analysis algorithm including a language knowledge graph transferring multi-lingual skills and mapping courses across electronic content in the multiple languages with a combined literacy acquisition map, to manage the transferable skills identified between the multiple languages;

track changes in the data representative of the learning objective, literacy acquisition, one or more essential concepts, literacy education, one or more learning challenges, one or more skills, and the level of skill difficulty across the multiple languages;

provide an automated multi-lingual toggle for dynamic switching between the multiple languages including switching among at least one of recommendations and groupings, and skill instructional support configured for each language in the multiple languages, wherein the toggle facilitates toggling between paired literacy acquisition learning objectives; and use skill difficulty data and mastery reporting specific to each learning progression program.

2. The computer-implemented method according to claim 1, wherein the dynamic switching between a plurality of multiple languages includes switching between recommendations generated in different multiple languages, groupings in different, and skill instructional support in different multiple languages.

3. The computer-implemented method according to claim 1, wherein the transferable skills include one or more degrees of transference, identification of one or more essential skills, identification of an area of learning challenge, and identification of one or more skills that appear similar but are different in meaning.

4. The computer-implemented method according to claim 1, wherein the transferable skill analysis algorithm further comprises the language knowledge graph, which is created by a plurality of machine learning engines, one or more invariant skills, and a variant model.

5. The computer-implemented method according to claim 1, wherein the executable code stored in the memory further causes the one or more processors to execute control action over the network to:

provide an output in a user interface, wherein the user interface comprises a dashboard for display of at least one from a group of: assessment data, resource data, language-specific data, standards data, and measurement data.

6. The computer-implemented method according to claim 1, wherein the combined literacy acquisition map comprises one or more transferable skills, one or more learning objectives, one or more multilingual skills, one or more areas of learning challenge, and one or more authentic learning progression models.

7. The computer-implemented method according to claim 1, wherein the executable code stored in the memory further causes the one or more processors to execute control action over a network to:

provide mapping of how all content from one or more language sources are associated based on jurisdiction data.

8. The computer-implemented method according to claim 1, wherein the executable code stored in the memory further causes the one or more processors to execute control action over the network to:

provide an output in a user interface, wherein the user interface comprises a dashboard for display of language-specific data and wherein the user interface includes a multi-lingual toggle feature that facilitates switching between a plurality of the multiple languages.

9. The computer-implemented method according to claim 8, wherein the multi-lingual toggle feature facilitates switchable digital reading in the multiple languages and enables collaboration in and with pages of at least one of digital books, articles, and documents.

10. The computer-implemented method according to claim 1, wherein the executable code stored in the memory further causes the one or more processors to execute control action over the network to:

provide a multilingual learning user interface with access to views of data representative of multiple learning progressions, language specific instructional snippets, combined literacy acquisition learning mapping, instructional planning and grouping recommendations, and student multiliterate achievement, mastery, and growth.

11. A system comprising:

a server, comprising one or more processors;

a memory coupled to the one or more processors, storing executable code configured to cause the one or more processors to execute control action over a network to:

track, using the one or more processors at the server, over the network, holistic and longitudinal growth patterns for a plurality of students in different educational jurisdictions;

execute, using the one or more processors at the server, over the network, a plurality of learning progression programs in multiple languages for the plurality of students, wherein each learning progression program defines data representative of a learning objective, literacy acquisition, one or more essential concepts, literacy education, one or more learning challenges, one or more skills, and a level of skill difficulty;

identify, using the one or more processors at the server, over the network, one or more transferable skills between the multiple languages;

use a transferable skill analysis algorithm including a language knowledge graph transferring multi-lingual skills and mapping courses across electronic content in the multiple languages with a combined literacy acquisition map, to manage the transferable skills identified between the multiple languages;

track changes in the data representative of the learning objective, literacy acquisition, one or more essential concepts, literacy education, one or more learning challenges, one or more skills, and the level of skill difficulty across the multiple languages;

provide a toggle for dynamic switching between the multiple languages including switching among at least one of recommendations and groupings, and skill instructional support configured for each language in the multiple languages, wherein the toggle facilitates toggling between paired literacy acquisition learning objectives; and use skill difficulty data and mastery reporting specific to each learning progression program.

12. The system according to claim 11, wherein the dynamic switching between a plurality of multiple languages includes switching between recommendations in different multiple languages, groupings in different, and skill instructional support in different multiple languages.

13. The system according to claim 11, wherein the transferable skills include a degree of transference, one or more essential skills, an area of learning challenge, one or more skills that appear similar but are different in meaning.

14. The system according to claim 11, wherein the transferable skill analysis algorithm comprises a language knowledge graph created by a plurality of machine learning engines, one or more invariant skills, and a variant model.

15. The system according to claim 11, wherein the executable code stored in the memory further causes the one or more processors to execute control action over the network to:
provide an output in a user interface, wherein the user interface comprises a dashboard for display of at least one from a group of: assessment data, resource data, language-specific data, standards data, and measurement data.

16. The system according to claim 11, wherein the combined literacy acquisition map comprises one or more transferable skills, one or more learning objectives, one or more multilingual skills, one or more areas of learning challenge, and one or more authentic learning progression models.

17. The system according to claim 11, wherein the executable code stored in the memory further causes the one or more processors to execute control action over a network to:
provide mapping of how all content from one or more language sources are associated based on jurisdiction data.

18. The system according to claim 11, wherein the executable code stored in the memory further causes the one or more processors to execute control action over the network to:
provide an output in a user interface, wherein the user interface comprises a dashboard for display of language-specific data and wherein the user interface includes a multi-lingual toggle feature that facilitates switching between a plurality of the multiple languages.

19. The system according to claim 18, wherein the multi-lingual toggle feature facilitates switchable digital reading in the multiple languages and enables collaboration in and with pages of at least one of digital books, articles, and documents.

20. The system according to claim 19, wherein the executable code stored in the memory further causes the one or more processors to execute control action over the network to:
provide a multilingual learning user interface with access to views of data representative of multiple learning progressions, language specific instructional snippets, combined literacy acquisition learning mapping, instructional planning and grouping recommendations, and student multiliterate achievement, mastery, and growth.

* * * * *